(12) United States Patent
Chen

(10) Patent No.: US 12,469,240 B2
(45) Date of Patent: Nov. 11, 2025

(54) SKINNING METHOD AND APPARATUS FOR VIRTUAL OBJECT, ELECTRONIC DEVICE, STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventor: Tiancai Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 233 days.

(21) Appl. No.: 18/329,974

(22) Filed: Jun. 6, 2023

(65) Prior Publication Data
US 2023/0316688 A1 Oct. 5, 2023

Related U.S. Application Data

(63) Continuation of application No. PCT/CN2022/134011, filed on Nov. 24, 2022.

(30) Foreign Application Priority Data

Feb. 25, 2022 (CN) .......................... 202210177689.X

(51) Int. Cl.
*G06T 19/20* (2011.01)
*G06T 7/73* (2017.01)

(52) U.S. Cl.
CPC .............. *G06T 19/20* (2013.01); *G06T 7/73* (2017.01); *G06T 2200/24* (2013.01);
(Continued)

(58) Field of Classification Search
None
See application file for complete search history.

(56) References Cited

U.S. PATENT DOCUMENTS

2019/0206145 A1* 7/2019 Li .......................... G06T 15/503
2019/0362529 A1 11/2019 Wedig et al.
(Continued)

FOREIGN PATENT DOCUMENTS

| CN | 109993819 A | 7/2019 |
| CN | 112184862 A | 1/2021 |

(Continued)

OTHER PUBLICATIONS

The World Intellectual Property Organization (WIPO) International Search Report for PCT/CN2022/134011 Jan. 28, 2023 8 Pages (including translation).

(Continued)

*Primary Examiner* — Ryan M Gray
(74) *Attorney, Agent, or Firm* — ANOVA LAW GROUP, PLLC

(57) ABSTRACT

A skinning method includes obtaining a three-dimensional model and an object skeleton of a virtual object, and determining a vertex position of a model vertex of the three-dimensional model and a joint position of a skeleton joint of the object skeleton. The vertex position is determined by at least the joint position. The method further includes determining a skinning parameter corresponding to the skeleton joint based at least on the vertex position and the joint position, and skinning an object skeleton of the virtual object based at least on the skinning parameter.

16 Claims, 13 Drawing Sheets

(52) U.S. Cl.
CPC .............. *G06T 2207/20081* (2013.01); *G06T 2207/30196* (2013.01); *G06T 2219/2016* (2013.01); *G06T 2219/2021* (2013.01)

(56) References Cited

U.S. PATENT DOCUMENTS

2020/0410733 A1* 12/2020 Liu .......................... G06T 15/10
2023/0316688 A1    10/2023 Chen
2023/0351698 A1    11/2023 Chang

FOREIGN PATENT DOCUMENTS

| CN | 112802161 A | * | 5/2021 | ............. G06T 13/40 |
|----|-------------|---|--------|--------------------------|
| CN | 112862933 A |   | 5/2021 |                          |
| CN | 112884868 A |   | 6/2021 |                          |
| CN | 113240815 A | * | 8/2021 | ........... G06N 3/0454  |
| CN | 113902876 A |   | 1/2022 |                          |
| CN | 114241100 A |   | 3/2022 |                          |
| CN | 118279488 A | * | 7/2024 |                          |

OTHER PUBLICATIONS

The State Intellectual Property Office of the People's Republic of China (SIPO) Office Action 1 for 202210177689.X Apr. 7, 2022 13 Pages (including translation).

* cited by examiner (1) (2)

(1)

(2)

(3)

(4)

SKINNING METHOD AND APPARATUS FOR VIRTUAL OBJECT, ELECTRONIC DEVICE, STORAGE MEDIUM, AND COMPUTER PROGRAM PRODUCT

CROSS-REFERENCE TO RELATED APPLICATIONS

This application is a continuation of International Application No. PCT/CN2022/134011, filed on Nov. 24, 2022, which is based on and claims priority to Chinese Patent Application No. 202210177689.X, filed on Feb. 25, 2022, which are incorporated herein by reference in their entirety.

FIELD OF THE TECHNOLOGY

This application relates to the field of computer technologies, and in particular, to a skinning method and apparatus for a virtual object, an electronic device, a computer-readable storage medium, and a computer program product.

BACKGROUND OF THE DISCLOSURE

In related technologies, skeleton joints of skeletons in various forms required during skeleton skinning are usually unified into a super skeleton, so that the super skeleton can be skinned correspondingly according to different influence weights of various skeleton joints in the super skeleton that correspond to various vertices of a three-dimensional model during the skeleton skinning, to implement different forms of skeleton skinning through the super skeleton. However, the skeleton joints that can be unified into a super skeleton usually correspond to similar or slightly different skeleton structures. Therefore, skinning of virtual objects with similar skeleton structures can still be achieved in the related technologies, but skinning of virtual objects with greatly different skeleton structures (such as a person and an animal) cannot be supported, leading to a poor skinning effect.

SUMMARY

In accordance with the disclosure, there is provided a skinning method including obtaining a three-dimensional model and an object skeleton of a virtual object, and determining a vertex position of a model vertex of the three-dimensional model and a joint position of a skeleton joint of the object skeleton. The vertex position is determined by at least the joint position. The method further includes determining a skinning parameter corresponding to the skeleton joint based at least on the vertex position and the joint position, and skinning an object skeleton of the virtual object based at least on the skinning parameter.

Also in accordance with the disclosure, there is provided an electronic device including a memory storing a computer executable instruction and a processor configured to execute the computer executable instruction to obtain a three-dimensional model and an object skeleton of a virtual object, and determine a vertex position of a model vertex of the three-dimensional model and a joint position of a skeleton joint of the object skeleton. The vertex position is determined by at least the joint position. The processor is further configured to execute the executable instruction to determine a skinning parameter corresponding to the skeleton joint based at least on the vertex position and the joint position, and skin an object skeleton of the virtual object based at least on the skinning parameter.

Also in accordance with the disclosure, there is provided a non-transitory computer-readable storage medium storing a computer executable instruction that, when executed by a processor, cause the processor to obtain a three-dimensional model and an object skeleton of a virtual object, and determine a vertex position of a model vertex of the three-dimensional model and a joint position of a skeleton joint of the object skeleton. The vertex position is determined by at least the joint position. The computer executable instruction further causes the processor to execute the executable instruction to determine a skinning parameter corresponding to the skeleton joint based at least on the vertex position and the joint position, and skin an object skeleton of the virtual object based at least on the skinning parameter.

DESCRIPTION OF EMBODIMENTS

Figure 1:
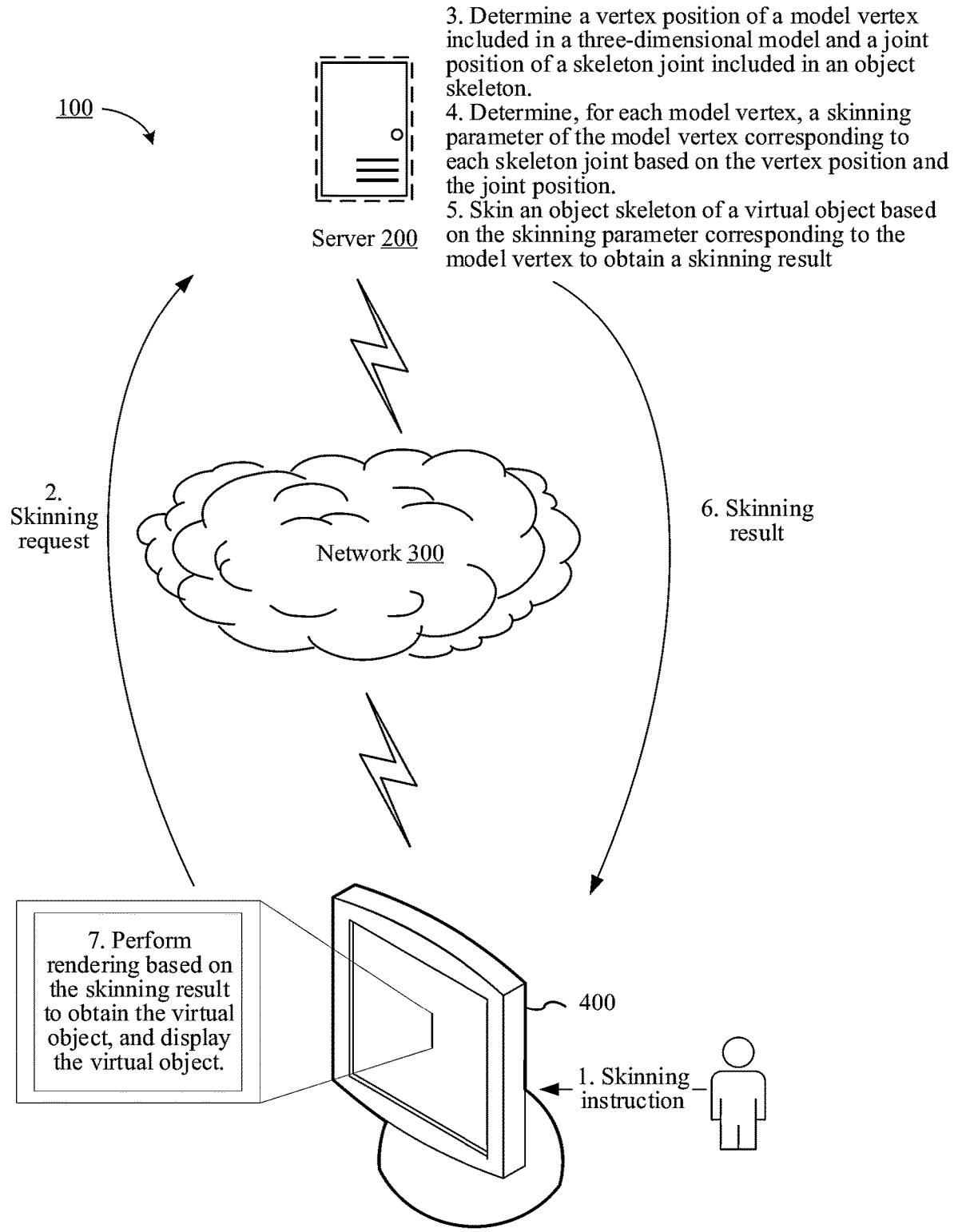
FIG. 1 is a schematic architectural diagram of a skinning system 100 for a virtual object according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

The following description relates to "some embodiments", which describe subsets of all possible embodiments, but it may be understood that "some embodiments" may be the same subset or different subsets of all the possible embodiments, and can be combined with each other without conflict.

In the following description, the involved terms "first\second\third" are merely intended to distinguish between similar objects and do not represent a specific order of objects. It can be understood that "first\second\third" can be interchanged in a specific order or sequential order if allowed, so that the embodiments of this application described herein can be implemented in an order other than that illustrated or described herein.

Unless otherwise defined, meanings of all technical and scientific terms used in this specification are the same as those usually understood by a person skilled in the technical field of this application. Terms used in this specification are merely intended to describe objectives of the embodiments of this application, and are not intended to limit this application.

Before the embodiments of this application are further described in detail, a description is made on nouns and terms involved in the embodiments of this application, and the nouns and terms involved in the embodiments of this application are applicable to the following explanations.

(1) "In response to" is used for representing a condition or a state on which an operation to be performed depends. When the dependent condition or state is satisfied, one or more operations may be performed in real time or may have a specified delay. Unless otherwise specified, there is no restriction on an order of performing a plurality of operations to be performed.

(2) Virtual objects are images of various people and objects appearing in virtual scenes (such as games, animation, or film and television dramas). The virtual object may be a virtual character, a virtual animal, an animation character, or the like, for example: a character, an animal, a plant, an oil drum, a wall, or a stone displayed in a virtual scene.

(3) Skinning is a three-dimensional animation term used in a 3D virtual scene (such as a game scene). On the basis of a three-dimensional model created in three-dimensional software, skeletons are to be added to the three-dimensional model. However, the skeletons and the three-dimensional model are independent of each other. Therefore, to cause the skeletons to drive the three-dimensional model to produce proper movement, the three-dimensional model is bound to the skeleton, and a technology for achieving this is referred to as skinning.

The embodiments of this application provide a skinning method and apparatus for a virtual object, a device, a storage medium, and a computer program product, which can improve an effect of virtual object skinning and increase flexibility of the virtual object skinning.

The following describes an implementation scenario of a skinning method for a virtual object provided in the embodiments of this application. FIG. 1 is a schematic architectural diagram of a skinning system 100 for a virtual object according to an embodiment of this application. To support an exemplary application, a terminal 400 is connected to a server 200 through a network 300. The network 300 may be a wide area network or a local area network, or a combination of the two, using wireless or wired links for data transmission.

The terminal 400 is configured to send a skinning request for a virtual object to the server 200 in response to a skinning instruction for the virtual object.

The server 200 is configured to receive the skinning request for the virtual object, and obtain a three-dimensional model and an object skeleton of the virtual object; determine a vertex position of at least one model vertex included in the three-dimensional model and a joint position of at least one skeleton joint included in the object skeleton; determine, for each model vertex, a skinning parameter of the model vertex corresponding to each skeleton joint based on the vertex position and at least one joint position; and skin the object skeleton of the virtual object based on the skinning parameter corresponding to the at least one model vertex to obtain a skinning result, and return the skinning result to the terminal 400, the vertex position of the model vertex being determined by the joint position of the at least one skeleton joint, and the skinning parameter being used for indicating an influence weight of each skeleton joint on the model vertex.

The terminal 400 is configured to receive the skinning result returned by the server 200, and perform rendering based on the skinning result to obtain the virtual object; and display the virtual object obtained through rendering.

In some embodiments, the skinning method for a virtual object provided in the embodiments of this application may be implemented by various electronic devices, for example, may be implemented by a terminal alone, or may be implemented by a server alone, or may be implemented by a terminal and a server in cooperation. For example, a terminal alone performs the skinning method for a virtual object provided in the embodiments of this application, or a terminal sends a skinning request for a virtual object to a server, and the server performs, according to the received skinning request, the skinning method for a virtual object provided in the embodiments of this application. Embodiments of this application may be applied to various scenarios, including but not limited to, a cloud technology, artificial intelligence, smart transportation, assisted driving, and the like.

In some embodiments, the electronic device for implementing the skinning method for a virtual object provided in the embodiments of this application may be various types of terminal devices or servers. The server (such as the server 200) may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal (such as the terminal 400) may be a smartphone, a tablet computer, a notebook computer, a desktop computer, an intelligent voice interaction device (such as a smart speaker), a smart home appliance (such as a smart television), a smartwatch, an in-vehicle terminal, or the like, but is not limited thereto. The terminal and the server may be directly or indirectly connected in a wired or wireless communication manner. This is not limited in embodiments of this application.

In some embodiments, the terminal or the server may run a computer program to implement the skinning method for a virtual object provided in the embodiments of this application. For example, the computer program may be a native program or a software module in an operating system; or may be a native application (APP), that is, a program that needs to be installed in an operating system to run; or may be a mini program, that is, a program that only needs to be downloaded into a browser environment to run; or may be a mini program that can be embedded in any APP. In summary, the foregoing computer program may be any form of application, module, or plug-in.

In some embodiments, a plurality of servers may constitute a blockchain, and the servers are nodes on the blockchain. There may be information connections between each node in the blockchain. Information may be transmitted between the nodes through the foregoing information connections. Data (such as a three-dimensional model, an object skeleton, or a skinning parameter of a virtual object) related to the skinning method for a virtual object provided in the embodiments of this application may be stored on the blockchain.

Figure 2:
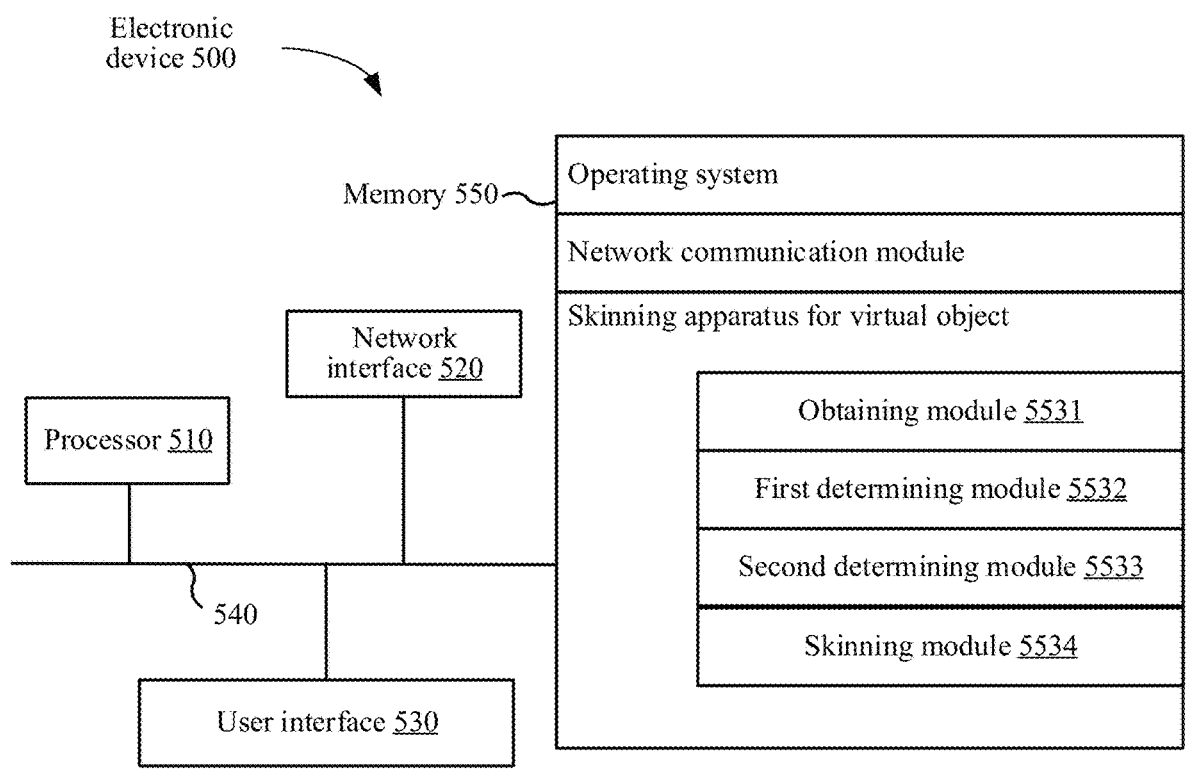
FIG. 2 is a schematic structural diagram of an electronic device 500 for implementing a skinning method for a virtual object according to an embodiment of this application.

The following describes an electronic device for implementing a skinning method for a virtual object provided in the embodiments of this application. FIG. 2 is a schematic structural diagram of an electronic device 500 for implementing a skinning method for a virtual object according to an embodiment of this application. As an example, the electronic device 500 is the terminal shown in FIG. 1, and the electronic device 500 for implementing a skinning method for a virtual object provided in embodiments of this application includes: at least one processor 510, a memory 550, at least one network interface 520, and a user interface 530. All the components in the electronic device 500 are coupled together by using a bus system 540. It may be understood that, the bus system 540 is configured to implement connection and communication between the components. In addition to a data bus, the bus system 540 also includes a power bus, a control bus, and a status signal bus. However, for clarity of description, all types of buses in FIG. 2 are marked as the bus system 540.

In some embodiments, the skinning apparatus for a virtual object provided in the embodiments of this application may be implemented in the form of software. FIG. 2 shows a skinning apparatus 553 for a virtual object that is stored in the memory 550, which may be software in the form of a program, a plug-in, or the like, and include the following software modules: an obtaining module 5531, a first determining module 5532, a second determining module 5533, and a skinning module 5534. These modules are logical and therefore can be arbitrarily combined or further split depending on functions implemented. The functions of the modules are to be described below.

Figure 3:
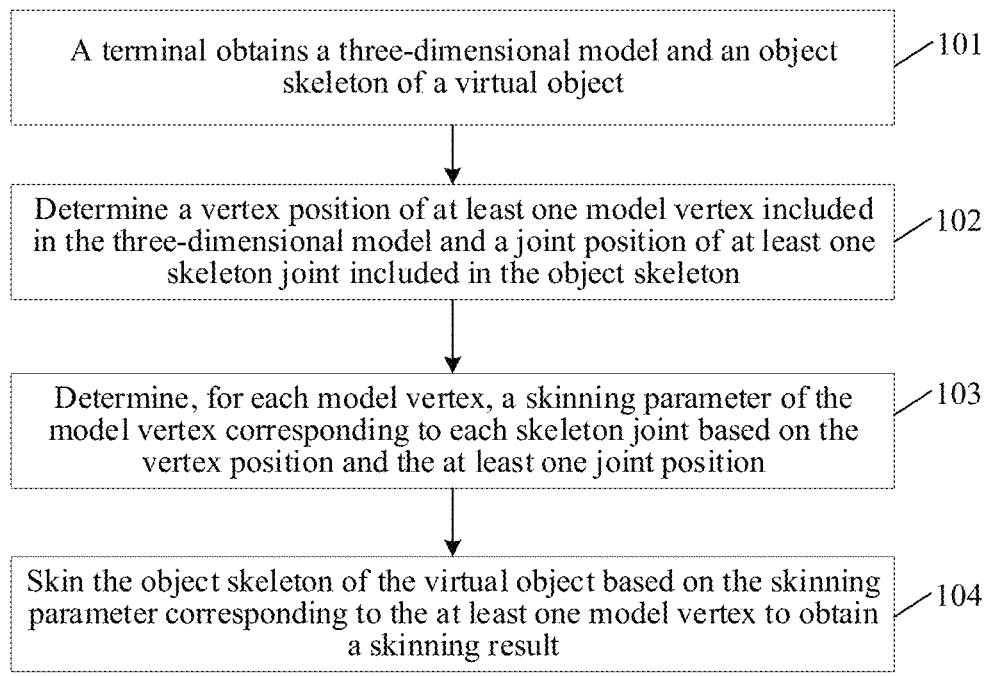
FIG. 3 is a schematic flowchart of a skinning method for a virtual object according to an embodiment of this application.

The following describes a skinning method for a virtual object provided in the embodiments of this application. In some embodiments, the skinning method for a virtual object provided in the embodiments of this application may be implemented by various electronic devices, for example, may be implemented by a terminal alone, or may be implemented by a server alone, or may be implemented by a terminal and a server in cooperation. As an example, the method is implemented by a terminal. FIG. 3 is a schematic flowchart of a skinning method for a virtual object according to an embodiment of this application. The skinning method for a virtual object provided in embodiments of this application includes the following steps:

Step 101: The terminal obtains a three-dimensional model and an object skeleton of the virtual object.

Herein, the terminal may be provided with an application for skinning the virtual object. The terminal runs the corresponding application to implement the skinning of the virtual object. During actual application, the terminal first obtains the three-dimensional model and the object skeleton of the virtual object during the skinning. For example, a plurality of three-dimensional models and a plurality of object skeletons may be preset and stored at a storage location (such as a database, local storage, or cloud storage), and can be obtained from the storage location and used when needed. The three-dimensional model includes at least one model vertex, each model vertex has a corresponding vertex position, and the vertex position may be described by three-dimensional position coordinates. The object skeleton includes at least one skeleton joint, each skeleton joint has a corresponding joint position, and the joint position may also be described by three-dimensional position coordinates.

Figure 4:
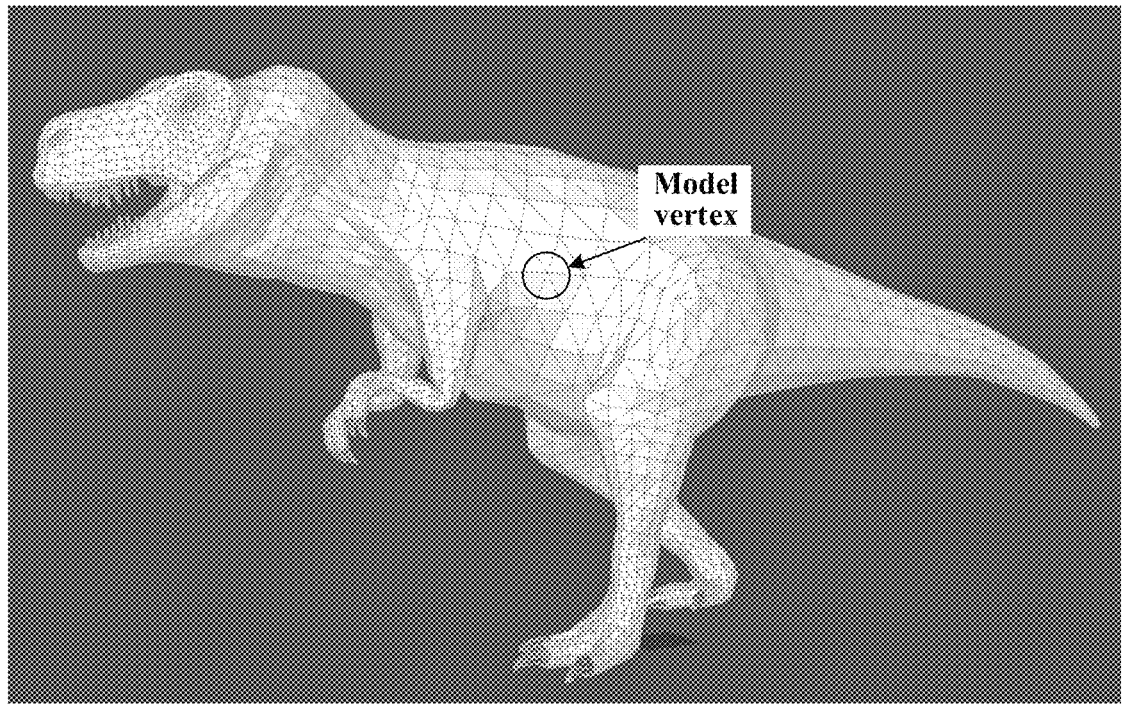
FIG. 4 is a schematic diagram of a three-dimensional model and an object skeleton according to an embodiment of this application.
Figure 4:
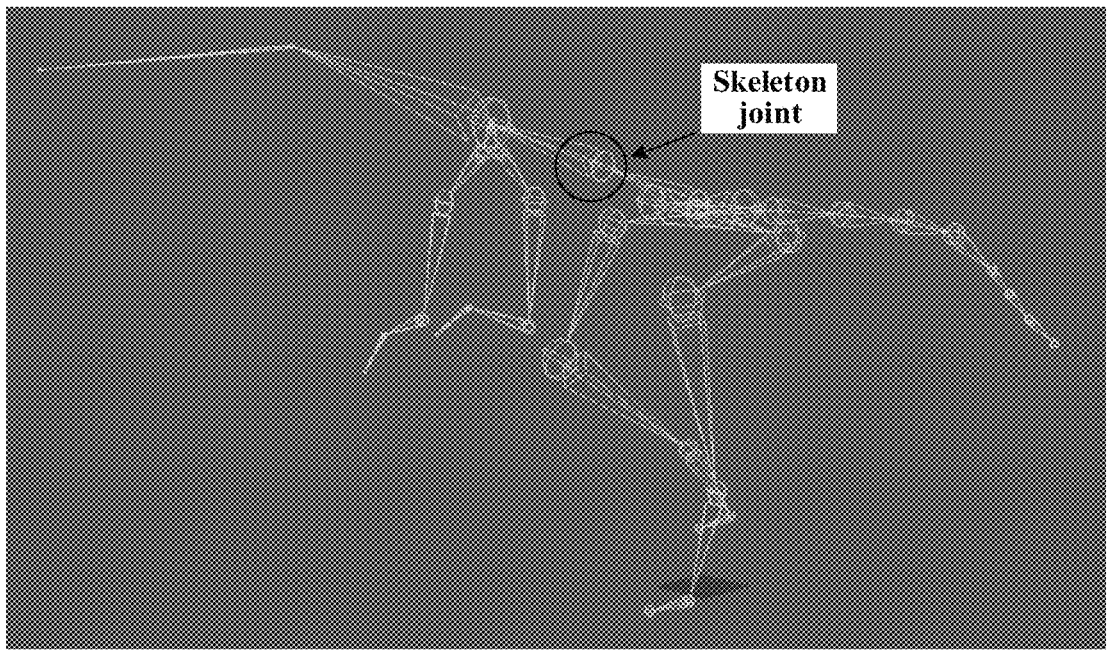

In an example, FIG. 4 is a schematic diagram of a three-dimensional model and an object skeleton according to an embodiment of this application. Herein, as shown in part (1) of FIG. 4, the three-dimensional model includes a plurality of model vertices, and each model vertex has a corresponding vertex position. As shown in part (2) of FIG. 4, the object skeleton includes a plurality of skeleton joints, and each skeleton joint has a corresponding joint position.

In some embodiments, the terminal may obtain the three-dimensional model and the object skeleton of the virtual object in the following manner: presenting a model selection function option, a skeleton selection function option, and a skinning function option in a virtual object skinning interface; receiving a target three-dimensional model selected based on the model selection function option, and determining the target three-dimensional model as the three-dimensional model in response to a confirmation operation for the target three-dimensional model; receiving a target object skeleton selected based on the skeleton selection function option, and determining the target object skeleton as the object skeleton in response to a confirmation operation for the target object skeleton; and obtaining the three-dimensional model and the object skeleton of the virtual object in response to a trigger operation for the skinning function option.

Herein, the three-dimensional model and the object skeleton of the virtual object may be selected by a user according to needs. During actual application, the terminal provides a skinning interface for implementing skinning of a virtual object. The skinning interface may display a model selection function option for selecting a three-dimensional model of the virtual object and a skeleton selection function option for selecting an object skeleton of the virtual object. The user may select a required three-dimensional model of the virtual object based on the model selection function option, and select a required object skeleton of the virtual object based on the skeleton selection function option.

First, a three-dimensional model is selected: When a trigger operation for the model selection function option is received, a plurality of candidate three-dimensional models for selection are presented. In response to a select operation on a target three-dimensional model in the plurality of candidate three-dimensional models, the target three-dimensional model selected based on the model selection function option is received. In this case, when a confirmation operation for the target three-dimensional model is received, it is determined that the selected target three-dimensional model is the three-dimensional model of the virtual object. Then, an object skeleton is selected: When a trigger operation for the skeleton selection function option is received, a plurality of candidate object skeletons for selection are presented. In response to a select operation for a target object skeleton in the plurality of candidate object skeletons, the target object skeleton selected based on the skeleton selection function option is received. In this case, when a confirmation operation for the target object skeleton is received, it is determined that the selected target object skeleton is the object skeleton of the virtual object.

In addition, the skinning function option for triggering a skinning instruction for the virtual object may also be presented in the virtual object skinning interface. When a trigger operation for the skinning function option is received, it indicates that the user triggers the skinning instruction for the virtual object. In this case, in response to the trigger operation for the skinning function option, the three-dimensional model and the object skeleton of the virtual object are obtained, to skin the virtual object based on the three-dimensional model and the object skeleton.

Figure 5:
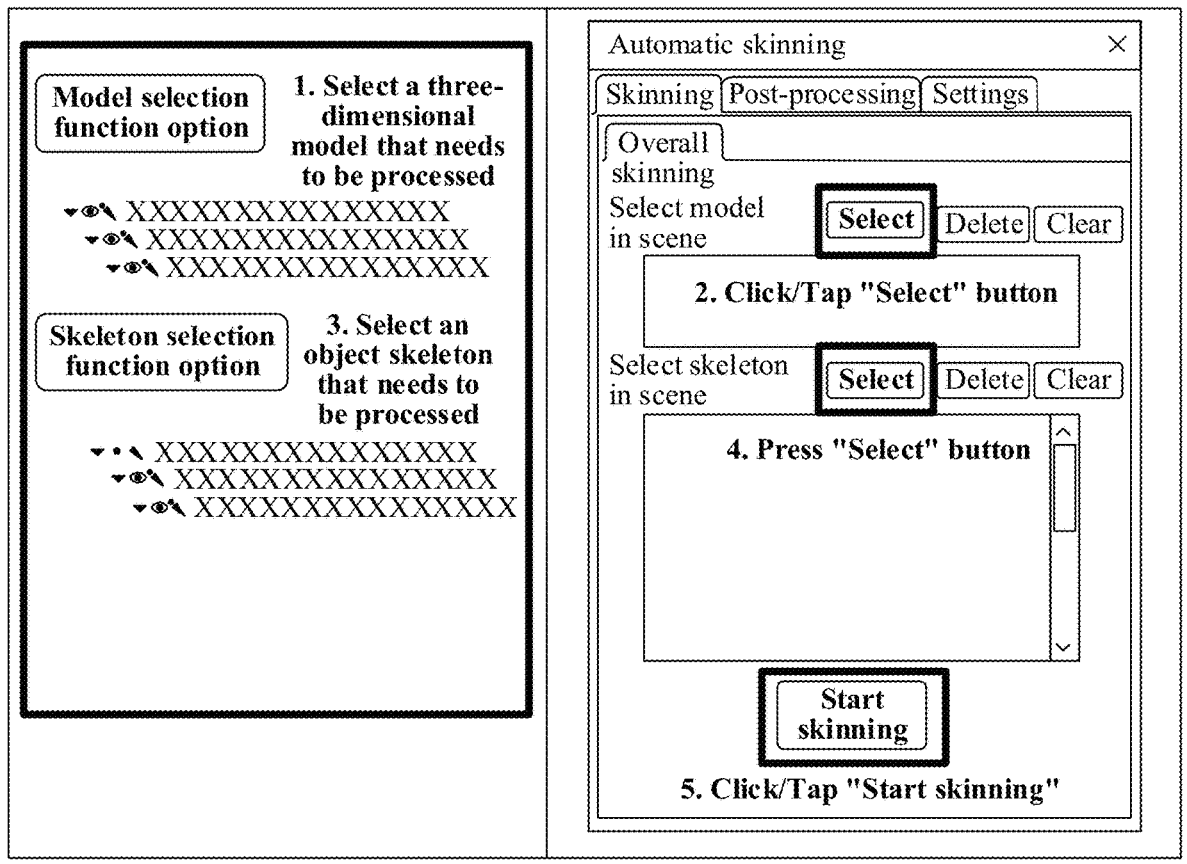
FIG. 5 is a schematic display diagram of a skinning interface according to an embodiment of this application.

In an example, FIG. 5 is a schematic display diagram of a skinning interface according to an embodiment of this application. Herein, in the virtual object skinning interface, a model selection function option for selecting a three-dimensional model of the virtual object and a skeleton selection function option for selecting an object skeleton of the virtual object are displayed, and a confirmation function option "Select" corresponding to the model selection function option and a confirmation function option "Select" corresponding to the skeleton selection function option are displayed. In addition, a skinning function option "Start skinning" for triggering a skinning instruction for the virtual object is also displayed.

Through application of the foregoing embodiment, a human-computer interaction interface for implementing the skinning method for a virtual object is provided for a user, making it convenient for the user to quickly and flexibly select a required three-dimensional model and a required object skeleton to implement virtual object skinning, thereby improving efficiency of the virtual object skinning.

Step 102: Determine a vertex position of at least one model vertex included in the three-dimensional model and a joint position of at least one skeleton joint included in the object skeleton.

Herein, after obtaining the three-dimensional model and the object skeleton of the virtual object, the terminal determines the vertex position of the at least one model vertex included in the three-dimensional model, that is, obtains three-dimensional coordinate information of each model vertex included in the three-dimensional model; and determines the joint position of the at least one skeleton joint included in the object skeleton, that is, obtains three-dimensional coordinate information of each skeleton joint included in the object skeleton.

Step 103: Determine, for each model vertex, a skinning parameter of the model vertex corresponding to each skeleton joint based on the vertex position and at least one joint position.

The vertex position of the model vertex is determined by the joint position of the at least one skeleton joint, and the skinning parameter is used for indicating an influence weight of the each skeleton joint on the model vertex.

Herein, after determining the vertex position of the at least one model vertex included in the three-dimensional model and the joint position of the at least one skeleton joint included in the object skeleton, the terminal performs the following processing for the each model vertex: determining, based on the vertex position of the model vertex and the joint position of the each skeleton joint, the skinning parameter of the model vertex corresponding to the each skeleton joint. During actual application, the vertex position of the model vertex is determined by the joint position of the at least one skeleton joint. In other words, the model vertex is affected by the at least one skeleton joint. The skinning parameter is used for indicating an influence weight of the each skeleton joint on the model vertex. A sum of influence weights corresponding to the same model vertex is 1.

During actual application, the process of skinning the virtual object may be understood as: establishing a binding relationship between the three-dimensional model and the object skeleton, that is, establishing a binding relationship between each model vertex and a corresponding skeleton joint to skin the object skeleton of the virtual object based on the established binding relationship. The at least one skeleton joint that can determine the vertex position of the model vertex is a skeleton joint having a binding relationship with the model vertex. The influence weight of the each skeleton joint on the model vertex is a binding weight of the each skeleton joint corresponding to the model vertex, to construct the binding relationship based on the binding weight.

In an example, a vertex position of model vertex 1 included in the three-dimensional model is determined by joint positions of skeleton joint 1, skeleton joint 2, and skeleton joint 3, that is, model vertex 1 is affected by skeleton joint 1, skeleton joint 2, and skeleton joint 3, and influence weights of skeleton joint 1 to skeleton joint 3 on model vertex 1 are respectively 0.5, 0.2, and 0.3. In other words, model vertex 1 has a binding relationship with skeleton joint 1, skeleton joint 2, and skeleton joint 3, with binding weights of 0.5, 0.2, and 0.3, respectively, which may be expressed by the following binding relationship formula: (Target vertex position of Model vertex 1)=0.5×(Vertex position of Model vertex 1)×(Skeletal transformation matrix of Skeleton joint 1)+0.2×(Vertex position of Model vertex 1)×(Skeletal transformation matrix of Skeleton joint 2)+0.3×(Vertex position of Model vertex 1)×(Skeletal transformation matrix of Skeleton joint 3). A sum of the influence weights of the skeleton joints corresponding to model vertex 1 is 1.

The following describes in detail, for each model vertex included in the three-dimensional model, how to determine the skinning parameter of the model vertex corresponding to the each skeleton joint. In some embodiments, the terminal may determine, in the following manner based on the vertex position and the at least one joint position, the skinning parameter of the model vertex corresponding to the each skeleton joint: performing the following processing for the joint position of the each skeleton joint: performing feature extraction on the vertex position to obtain a vertex feature of the model vertex, and performing feature extraction on the joint position to obtain a joint feature of the skeleton joint; determining a distance feature corresponding to a distance between the vertex position and the joint position; and determining the skinning parameter of the model vertex corresponding to the skeleton joint based on the vertex feature, the joint feature, and the distance feature.

Herein, for the each model vertex, the terminal may determine the skinning parameter of the model vertex corresponding to the each skeleton joint in the following manner: performing the following processing for the joint position of the each skeleton joint: First, feature extraction is performed on the vertex position of the model vertex to obtain a vertex feature of the model vertex, and feature extraction is performed on the joint position of the skeleton joint to obtain a joint feature of the skeleton joint. During actual implementation, feature extraction can be implemented through a feature extraction algorithm (such as a scale-invariant feature transformation algorithm) or a machine learning model for feature extraction or in other manners. Then, a distance feature corresponding to a distance between the vertex position and the joint position is obtained. For example, a Euclidean distance between the vertex position and the joint position may be determined, and then feature extraction is performed on the Euclidean distance to obtain the distance feature. Finally, the skinning parameter of the model vertex corresponding to the skeleton joint is determined based on the obtained vertex feature, joint feature, and distance feature.

Through application of the foregoing embodiment, the skinning parameter of the model vertex corresponding to the skeleton joint can be calculated only according to the vertex position of the model vertex and the joint position of the skeleton joint, so that calculation efficiency of the skinning parameter can be improved, occupancy of device computing resources can be reduced, and utilization of processing resources can be improved, thereby improving skinning efficiency.

During actual application, the foregoing steps of determining a skinning parameter of the model vertex corresponding to each skeleton joint may be implemented through a machine learning model. For example, feature extraction is performed on the vertex position through the machine learning model, or distance feature extraction is implemented through the machine learning model, or the like. Based on this, the machine learning model may be obtained through pre-training, and then the steps of determining a skinning parameter of the model vertex corresponding to each skeleton joint is implemented based on the machine learning model obtained through training.

In some embodiments, the terminal may obtain the machine learning model through training in the following manner to determine, through the machine learning model obtained through training, the skinning parameter of the model vertex corresponding to the each skeleton joint: obtaining training samples for training the machine learning model, the training samples being labeled with corresponding sample labels, the training samples including a vertex position sample and a joint position sample, and the sample labels being actual skinning parameters corresponding to the training samples; performing skinning parameter prediction based on the vertex position sample and the joint position sample through the machine learning model to obtain a prediction result; obtaining a difference between the prediction result and the sample label, and determining a value of a loss function of the machine learning model based on the difference; and updating model parameters of the machine learning model based on the value of the loss function to obtain a trained machine learning model.

Herein, a machine learning model may be constructed in advance, and during actual implementation, may be constructed based on a network such as a convolutional neural network, a deep neural network, or a recurrent neural network. After the machine learning model is constructed, the constructed machine learning model includes initial model parameters. To increase prediction accuracy of the machine learning model, the machine learning model is trained to update the model parameters of the machine learning model.

First, training samples for training the machine learning model are obtained, the training samples including a vertex position sample and a joint position sample. The training samples are labeled with corresponding sample labels, and the sample labels are actual skinning parameters corresponding to the training samples. In this way, the model parameters of the machine learning model are updated based on a difference between the actual skinning parameter in the sample label and the prediction result outputted by the machine learning model, to train the machine learning model.

Then, the training samples (that is, the vertex position sample and the joint position sample) are inputted into the machine learning model, and skinning parameter prediction is performed based on the vertex position sample and the joint position sample through the machine learning model to obtain the corresponding prediction result.

Finally, the model parameters of the machine learning model are updated based on the prediction result and the sample labels of the training samples. During actual implementation, a difference between the prediction result and the sample label (that is, the actual skinning parameter) is obtained, and a value of a loss function of the machine learning model is determined based on the difference. When the value of the loss function exceeds a loss threshold, an error signal of the machine learning model is determined based on the loss function, so that the error signal is propagated backward in the machine learning model, and model parameters of each layer in the machine learning model are updated during the propagation process to obtain the trained machine learning model.

Through application of the foregoing embodiment, the machine learning model is obtained through training, and through the machine learning model, the skinning parameter of the each model vertex corresponding to the each skeleton joint can be automatically determined according to the vertex position of the model vertex of the three-dimensional model and the joint position of the skeleton joint of the object skeleton, to implement skinning of the virtual object based on the skinning parameter, thereby automating virtual object skinning, and improving efficiency of the virtual object skinning.

In embodiments of this application, the machine learning model includes a position feature extraction layer, a position feature update layer, a distance feature extraction layer, a local feature extraction layer, a global feature extraction layer, a feature processing layer, a fully connected layer, and a feature prediction layer.

After the machine learning model is trained, processing is performed based on the trained machine learning model. In some embodiments, the terminal may perform feature extraction on the vertex position in the following manner to obtain a vertex feature of the model vertex: performing feature extraction on the vertex position through the position feature extraction layer of the machine learning model to obtain a first position feature of the model vertex; updating the first position feature based on a vertex position of at least one target model vertex associated with the model vertex through the position feature update layer of the machine learning model to obtain a second position feature of the model vertex; determining a local vertex feature of the model vertex based on the first position feature and the second position feature through the local feature extraction layer of the machine learning model; determining a global vertex feature of the model vertex based on the second position feature through the global feature extraction layer of the machine learning model; and performing a subtraction operation between the local vertex feature and the global vertex feature through the feature processing layer of the machine learning model to obtain the vertex feature of the model vertex.

Herein, first, the terminal performs feature extraction on the vertex position through the position feature extraction layer of the machine learning model to obtain the first position feature of the model vertex. Then, the first position feature is updated through the position feature update layer of the machine learning model. Specifically, a vertex position of at least one target model vertex associated with the model vertex is inputted into the position feature update layer, and the first position feature is updated through the position feature update layer to obtain the second position feature of the model vertex. Subsequently, the first position feature and the second position feature are inputted into the local feature extraction layer of the machine learning model, and the local vertex feature of the model vertex is obtained through the local feature extraction layer. In addition, the second position feature is inputted into the global feature extraction layer of the machine learning model, and the global vertex feature of the model vertex is determined based on the second position feature through the global feature extraction layer. Finally, the obtained local vertex feature and global vertex feature are inputted into the feature processing layer of the machine learning model, and the subtraction operation between the local vertex feature and the global vertex feature is performed through the feature processing layer to obtain the vertex feature of the model vertex.

Through application of the foregoing embodiment, vertex feature extraction of the model vertex is implemented through the machine learning model, improving accuracy and efficiency of vertex feature extraction, to ensure the calculation accuracy and calculation speed of the skinning parameter.

In some embodiments, the position feature update layer includes at least two cascaded position feature update sub-layers; and the terminal may update the first position feature in the following manner to obtain the second position feature of the model vertex: updating the first position feature based on the vertex position of the at least one target model vertex associated with the model vertex through a position feature update sub-layer of a first level (such position feature update sub-layer of the at least two cascaded position feature update sub-layers is also referred to as a "first level position feature update sub-layer") to obtain a corresponding intermediate position feature; and updating the intermediate position feature based on the vertex position of the at least one target model vertex associated with the model vertex through a position feature update sub-layer of a level other than the first level (such position feature update sub-layer of the at least two cascaded position feature update sub-layers is also referred to as a "non-first level position feature update sub-layer") to obtain the second position feature.

Herein, the foregoing position feature update layer includes at least two cascaded position feature update sub-layers. Based on this, the terminal may update the first position feature in the following manner to obtain the second position feature of the model vertex: updating the first position feature based on the vertex position of the at least one target model vertex associated with the model vertex through a first level position feature update sub-layer to obtain a corresponding intermediate position feature; and updating the intermediate position feature based on the vertex position of the at least one target model vertex associated with the model vertex through a non-first level position feature update sub-layer to obtain the second position feature. Specifically, an intermediate position feature outputted by a position feature update sub-layer of level i−1 (also referred to as an "(i−1)-th level position feature update sub-layer") is updated through a position feature update sub-layer of level i (also referred to as an "i-th level position feature update sub-layer") (where i is an integer greater than 1) based on the vertex position of the at least one target model vertex associated with the model vertex, and an update result is inputted into a position feature update sub-layer of level i+1 (also referred to as an "(i+1)-th level position feature update sub-layer"), until a position feature update sub-layer of the last level (also referred to as a "last level position feature update sub-layer"). A result outputted by the position feature update sub-layer at the last level is used as the second position feature.

During actual implementation, a target position feature of the vertex position of the at least one target model vertex associated with the model vertex may be extracted through the first level position feature update sub-layer, and then the first position feature is updated by aggregating the target position features to obtain the corresponding intermediate position feature.

Through application of the foregoing embodiment, a model depth of the machine learning model is enhanced by setting a position feature update layer of a cascaded structure, thereby improving calculation precision of the machine learning model and ensuring accuracy of the skinning parameter to improve a skinning effect.

In some embodiments, the terminal may determine at least one target model vertex associated with the model vertex in the following manner: determining vertex distances between the model vertex and at least two model vertices in the three-dimensional model other than the model vertex through the position feature update layer of the machine learning model; sorting the at least two other model vertices in ascending order of the vertex distances to obtain a corresponding sorting result; and selecting a target quantity of other model vertices ranking top based on the sorting result as the at least one target model vertex associated with the model vertex. During actual application, the target quantity may be preset, such as 6. After the at least two other model vertices are sorted in ascending order of the vertex distances, a plurality of other model vertices sorted in ascending order of the vertex distances are obtained, so that six other model vertices ranking top can be used as target model vertices.

Herein, the foregoing at least one target model vertex associated with the model vertex may be determined in the following manner: Through the position feature update layer of the machine learning model, at least two model vertices in the three-dimensional model other than the model vertex are determined, and then vertex distances between the model vertex and the other model vertices are calculated, so that the at least two other model vertices are sorted in ascending order of the vertex distances to obtain a sorting result, and a target quantity of other model vertices ranking top are selected from the at least two other model vertices based on the sorting result as the at least one target model vertex associated with the model vertex. During actual implementation, this process may be implemented through a k-nearest neighbors (k-NN) algorithm.

In some embodiments, the terminal may update the first position feature in the following manner to obtain the second position feature of the model vertex: performing feature extraction on the each target model vertex through the position feature update layer of the machine learning model to obtain a corresponding target position feature; averaging the at least one target position feature to obtain an average position feature; and updating the first position feature to the average position feature, and using the updated first position feature as the second position feature of the model vertex.

Through application of the foregoing embodiment, the position feature of the model vertex is updated according to target position features of a plurality of target model vertices close to the model vertex, so that the extracted position feature of the model vertex is more accurate, to improve calculation accuracy of the skinning parameter.

In some embodiments, the position feature update layer includes at least two cascaded position feature update sub-layers, and each of the position feature update sub-layers outputs a corresponding intermediate position feature. The terminal may determine the local vertex feature of the model vertex based on the first position feature and the second position feature in the following manner: inputting the first position feature and each intermediate position feature into the local feature extraction layer; and outputting the local vertex feature of the model vertex based on the first position feature and the each intermediate position feature through the local feature extraction layer.

Herein, the foregoing position feature update layer includes at least two cascaded position feature update sub-layers, and each of the position feature update sub-layers outputs a corresponding intermediate position feature. In this case, the terminal inputs the first position feature and the intermediate position feature that is outputted by the each position feature update sub-layers into the local feature extraction layer, thereby outputting the local vertex feature of the model vertex through the local feature extraction layer.

In some embodiments, the position feature update layer includes at least two cascaded position feature update sub-layers, and each of the position feature update sub-layers outputs a corresponding intermediate position feature. The terminal may determine the global vertex feature of the model vertex based on the second position feature in the following manner: inputting each intermediate position feature into the global feature extraction layer; and outputting the global vertex feature of the model vertex based on the each intermediate position feature through the global feature extraction layer.

Herein, the foregoing position feature update layer includes at least two cascaded position feature update sub-layers, and each of the position feature update sub-layers outputs a corresponding intermediate position feature. In this case, the terminal inputs the intermediate position feature outputted by the each position feature update sub-layer into the global feature extraction layer, thereby outputting the global vertex feature of the model vertex through the global feature extraction layer.

A procedure of extracting a joint feature of the skeleton joint may be the same as the foregoing procedure of extracting the vertex feature, that is, the processing procedures of the position feature extraction layer, the position feature update layer, the global feature extraction layer, the local feature extraction layer, and the feature processing layer of the machine learning model may also be applied to the extraction of a joint feature.

Through application of the foregoing embodiment, a model depth of the machine learning model is enhanced by setting a position feature update layer of a cascaded structure, thereby improving calculation precision of the machine learning model and ensuring accuracy of the skinning parameter to improve a skinning effect.

In some embodiments, the machine learning model further includes a distance feature extraction layer, and the terminal may determine a distance feature corresponding to the distance between the vertex position and the joint position in the following manner: determining the distance between the vertex position and the joint position through the distance feature extraction layer of the machine learning model; and performing feature extraction on the distance to obtain the distance feature.

Herein, the terminal calculates the distance between the vertex position and the joint position through the distance feature extraction layer of the machine learning model. For example, a Euclidean distance between the vertex position and the joint position may be calculated, and then feature extraction is performed on the obtained Euclidean distance to obtain the distance feature.

Through application of the foregoing embodiment, during determination of the skinning parameter of the model vertex corresponding to the skeleton joint, in addition to obtaining of the position feature of the model vertex and the joint feature of the skeleton joint, the distance feature corresponding to the distance between the vertex position and the joint position is also obtained. In this way, the skinning parameter of the model vertex corresponding to the skeleton joint is determined based on the vertex feature, the joint feature, and the distance feature, so that calculation of the skinning parameter is more accurate, thereby improving a skinning effect.

In some embodiments, the machine learning model further includes a fully connected layer and a feature prediction layer, and the terminal may determine the skinning parameter of the model vertex corresponding to the skeleton joint based on the vertex feature, the joint feature, and the distance feature in the following manner: concatenating the vertex feature, the joint feature, and the distance feature through the fully connected layer of the machine learning model to obtain a corresponding concatenated feature; and performing skinning parameter prediction based on the concatenated feature through the feature prediction layer of the machine learning model to obtain the skinning parameter of the model vertex corresponding to the skeleton joint.

Herein, the machine learning model further includes a fully connected layer and a feature prediction layer. The terminal may input the vertex feature, the joint feature, and the distance feature into the fully connected layer, to concatenate the vertex feature, the joint feature, and the distance feature based on the fully connected layer to obtain the corresponding concatenated feature. Then, skinning parameter prediction is performed based on the concatenated feature through the feature prediction layer to obtain the skinning parameter of the model vertex corresponding to the skeleton joint. During actual implementation, the feature prediction layer includes an activation function, such as a softmax function, and prediction may be performed based on the concatenated feature through the activation function to obtain the skinning parameter.

Through application of the foregoing embodiment, the skinning parameter of the each model vertex corresponding to the each skeleton joint is automatically determined through the machine learning model according to the vertex position of the model vertex of the three-dimensional model and the joint position of the skeleton joint of the object skeleton, to implement skinning of the virtual object based on the skinning parameter, thereby automating virtual object skinning, and improving efficiency of the virtual object skinning.

Figure 6:
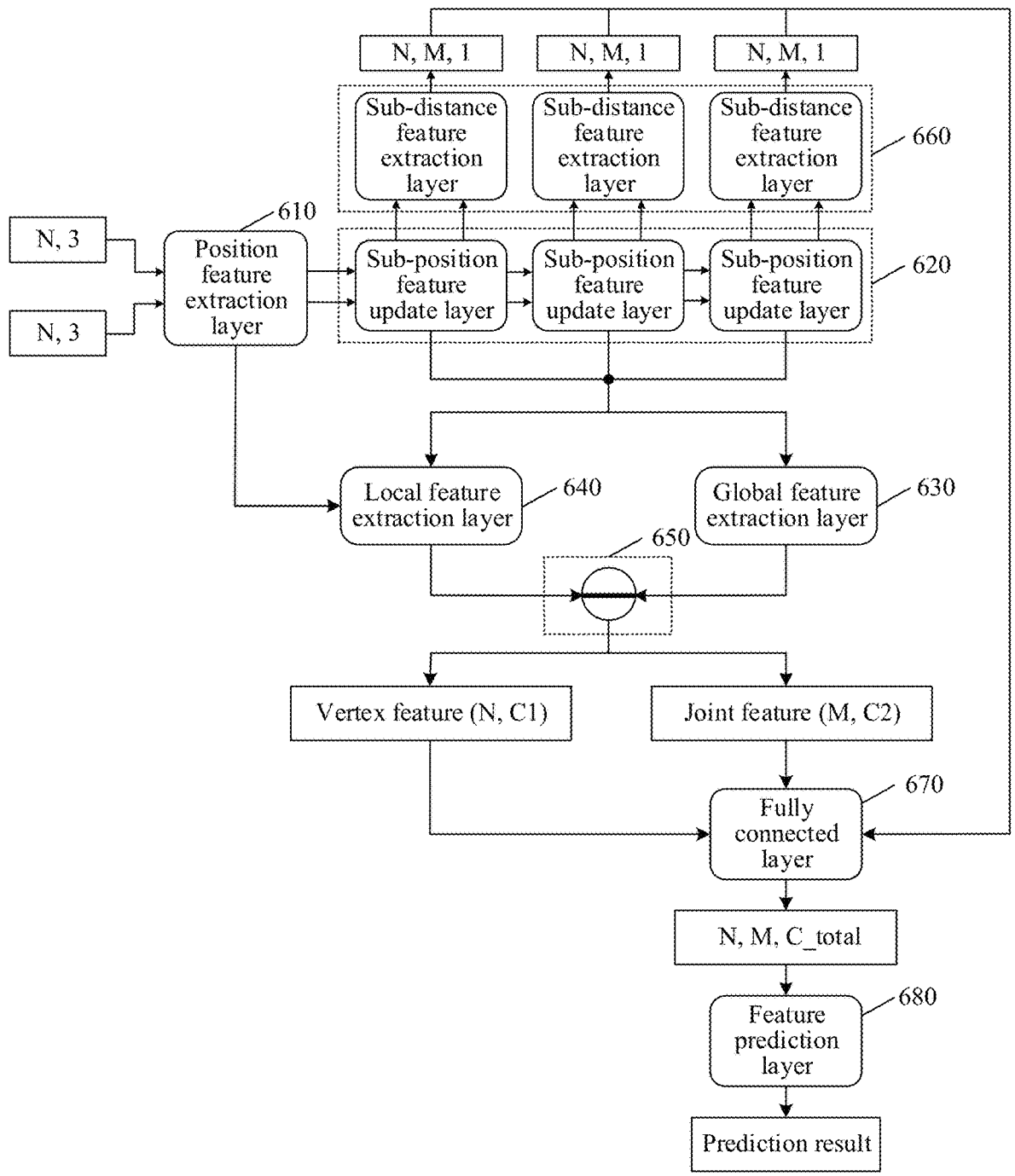
FIG. 6 is a schematic structural diagram of a machine learning model according to an embodiment of this application.

In an example, FIG. 6 is a schematic structural diagram of a machine learning model according to an embodiment of this application. Herein, the machine learning model includes a position feature extraction layer 610, a position feature update layer 620 (including three position feature update sub-layers), a global feature extraction layer 630, a local feature extraction layer 640, a feature processing layer 650, a distance feature extraction layer 660 (including three distance feature extraction sub-layers), a fully connected layer 670, and a feature prediction layer 680. Herein, the position feature extraction layer (Position-MLP), the local feature extraction layer (Local-MLP), and the global feature extraction layer (Global-MLP) are constructed based on MLP networks. A structure of each MLP network is shown in Table (1):

TABLE 1

| Name | Quantity of hidden layers | Dimension of hidden layers | Dimension of output layers |
|---|---|---|---|
| Position-MLP | 1 | 128 | 64 |
| Global-MLP | 2 | 512 | 256 |
| Local-MLP | 2 | 512 | 256 |

Inputs of the position feature extraction layer are (N, 3) and (M, 3). Herein, N represents a quantity of inputted model vertices of the three-dimensional model, M represents a quantity of inputted skeleton joints of the object skeleton, (N, 3) represents three-dimensional position information (x1, y1, z1) of the model vertex, and (M, 3) represents three-dimensional position information (x2, y2, z2) of the skeleton joint.

The position feature update layer includes a plurality of position feature update sub-layers (such as an edge convolution network EdgeConv). Each EdgeConv is used for extracting neighborhood information of a three-dimensional model and an object skeleton. Using processing of model vertices as an example, the EdgeConv may calculate a Euclidean distance between every two vertices in the three-dimensional model according to the position feature of each model vertex, and determine k neighboring model vertices (that is, the foregoing at least one target model vertex associated with the model vertex and determined through the k-NN algorithm), referred to as k-NN for short, of each model vertex. Then, position features of the k neighboring model vertices are aggregated to update the position feature of the model vertex to obtain an updated position feature. Herein, three EdgeConv networks are stacked to increase a depth of the network, thereby helping improve a fitting capability of a neural network.

The local feature extraction layer (Local-MLP) is used for processing based on outputs of the position feature extraction layer (Position-MLP) and outputs of the each position feature update sub-layer (EdgeConv) to obtain local features. Using processing of model vertices as an example, the local feature extraction layer (Local-MLP) obtains the local vertex feature. The global feature extraction layer (Global-MLP) performs processing based on the output of the each position feature update sub-layer (EdgeConv) to obtain global features. Using processing of model vertices as an example, the global feature extraction layer (Global-MLP) obtains the global vertex feature.

Using processing of model vertices as an example, the feature processing layer (that is, the intermediate subtraction operation between the Global-MLP and the Local-MLP) is used for subtracting the global vertex feature outputted by the global feature extraction layer (Global-MLP) from the local vertex feature outputted by the local feature extraction layer (Local-MLP) to obtain a vertex feature (N, C1). C1 is a feature dimension of the vertex feature. Using processing of skeleton joints as an example, the feature processing layer is used for subtracting the global joint feature outputted by the global feature extraction layer (Global-MLP) from the local joint feature outputted by the local feature extraction layer (Local-MLP) to obtain a joint feature (M, C2). C2 is a feature dimension of the joint feature.

The distance feature extraction layer includes three distance feature extraction sub-layers (Dist network). Each distance feature extraction sub-layer is connected to a corresponding position feature update sub-layer (EdgeConv). A distance feature is outputted based on the updated vertex position feature and joint position feature that are outputted by the corresponding position feature update sub-layer (EdgeConv).

The fully connected layer (concate layer) is used for concatenating the vertex feature outputted by the feature processing layer, the joint feature outputted by the feature processing layer, and the distance feature outputted by each distance feature extraction sub-layer (Dist network) to obtain a concatenated feature (N, M, C_total). C_total is a feature dimension of the concatenated feature.

The feature prediction layer (Predict-MLP) is used for performing skinning parameter (that is, influence weight) prediction based on the concatenated feature. Specifically, the feature prediction layer (Predict-MLP) outputs (N, M, 1) through the MLP based on the inputted concatenated feature (N, M, C_total), removes the last dimension through a squeeze operation to obtain (N, M), and then outputs, through an operation of the softmax function, a prediction result, that is, an influence weight of each skeleton corresponding to the model vertex.

The foregoing networks Position-MLP, EdgeConv, Global-MLP, and Local-MLP are shared by the model vertices of the three-dimensional model (mesh-graph) and the skeleton joints of the object skeleton (skeleton-graph). Each network has two sets of outputs. One set represents the output of the model vertex, and the other set represents the output of the skeleton joint.

Figure 7:
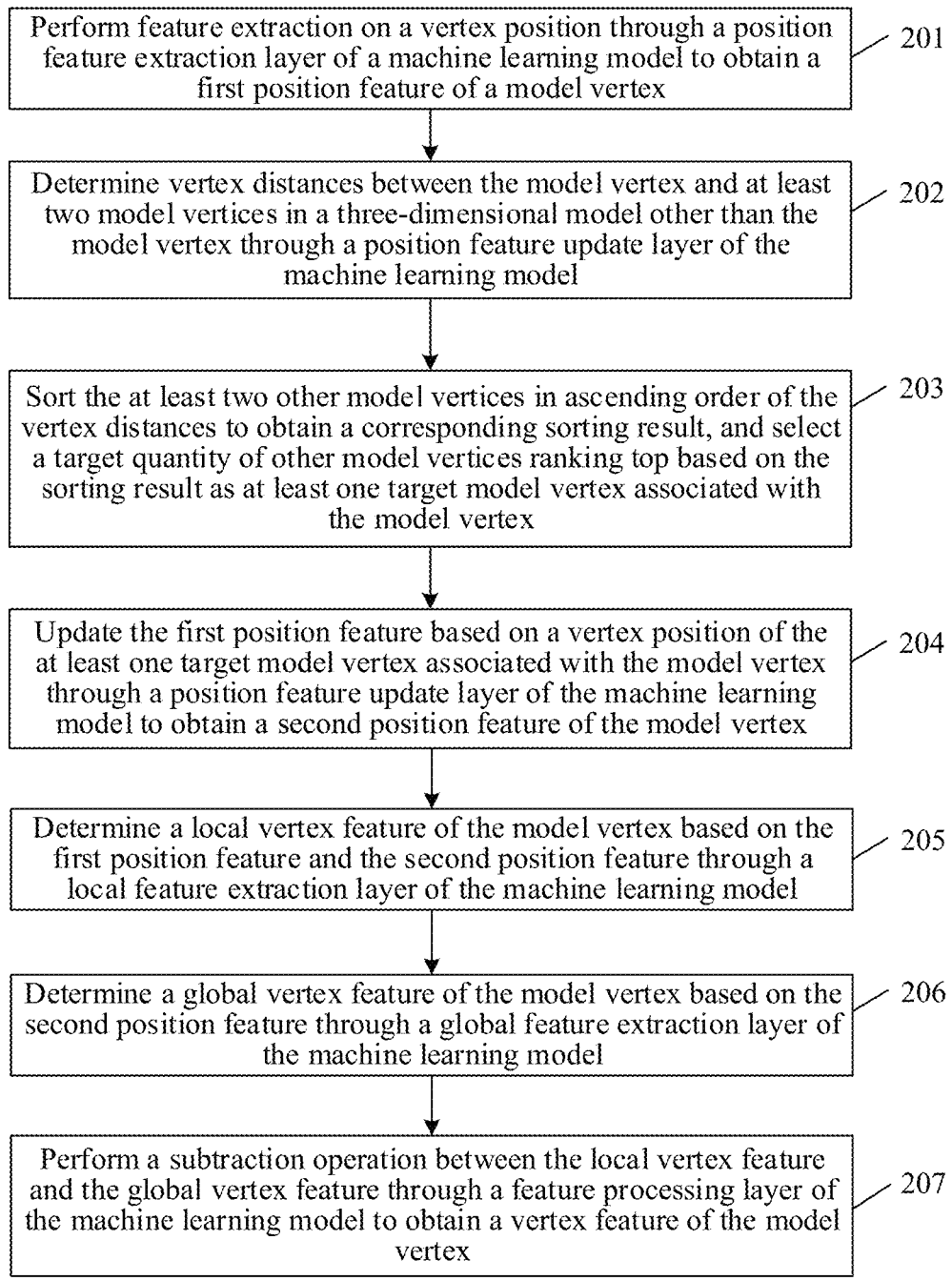
FIG. 7 is a schematic flowchart showing extracting a vertex feature of a model vertex according to an embodiment of this application.

FIG. 7 is a schematic flowchart showing extracting a vertex feature of a model vertex according to an embodiment of this application, including the following steps: Step 201: Perform feature extraction on the vertex position through a position feature extraction layer of a machine learning model to obtain a first position feature of the model vertex. Step 202: Determine vertex distances between the model vertex and at least two model vertices in the three-dimensional model other than the model vertex through a position feature update layer of the machine learning model. Step 203: Sort the at least two other model vertices in ascending order of the vertex distances to obtain a corresponding sorting result, and select a target quantity of other model vertices ranking top based on the sorting result as at least one target model vertex associated with the model vertex. Step 204: Update the first position feature based on a vertex position of the at least one target model vertex associated with the model vertex through a position feature update layer of the machine learning model to obtain a second position feature of the model vertex. Step 205: Determine a local vertex feature of the model vertex based on the first position feature and the second position feature through a local feature extraction layer of the machine learning model. Step 206: Determine a global vertex feature of the model vertex based on the second position feature through a global feature extraction layer of the machine learning model. Step 207: Perform a subtraction operation between the local vertex feature and the global vertex feature through a feature processing layer of the machine learning model to obtain the vertex feature of the model vertex.

Figure 8:
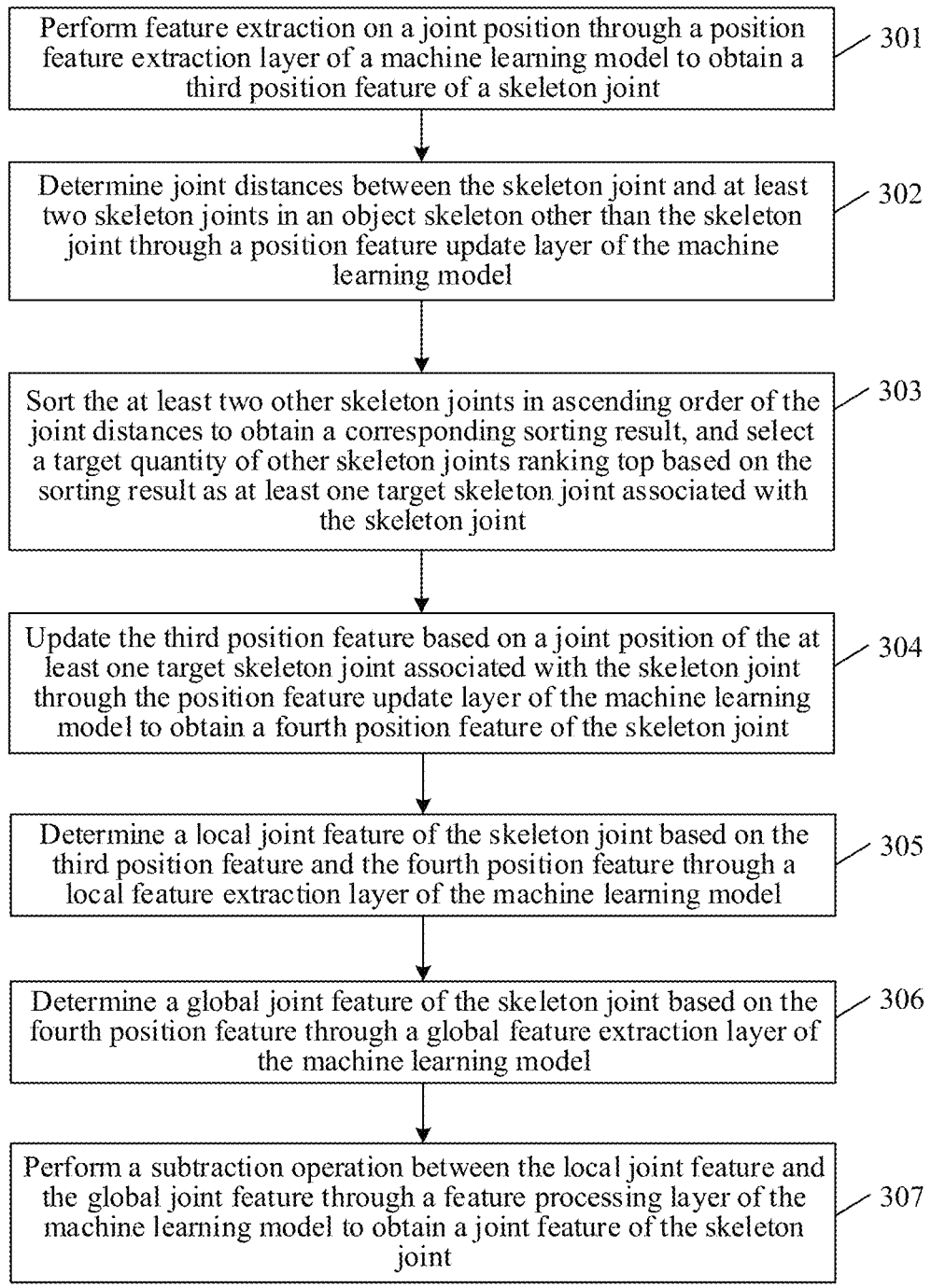
FIG. 8 is a schematic flowchart showing extracting a joint feature of a skeleton joint according to an embodiment of this application.

FIG. 8 is a schematic flowchart showing extracting a joint feature of a skeleton joint according to an embodiment of this application, including the following steps: Step 301: Perform feature extraction on a joint position through a position feature extraction layer of a machine learning model to obtain a third position feature of a skeleton joint. Step 302: Determine joint distances between the skeleton joint and at least two skeleton joints in an object skeleton other than the skeleton joint through a position feature update layer of the machine learning model. Step 303: Sort the at least two other skeleton joints in ascending order of the joint distances to obtain a corresponding sorting result, and select a target quantity of other skeleton joints ranking top based on the sorting result as at least one target skeleton joint associated with the skeleton joint. Step 304: Update the third position feature based on a joint position of the at least one target skeleton joint associated with the skeleton joint through the position feature update layer of the machine learning model to obtain a fourth position feature of the skeleton joint. Step 305: Determine a local joint feature of the skeleton joint based on the third position feature and the fourth position feature through a local feature extraction layer of the machine learning model. Step 306: Determine a global joint feature of the skeleton joint based on the fourth position feature through a global feature extraction layer of the machine learning model. Step 307: Perform a subtraction operation between the local joint feature and the global joint feature through a feature processing layer of the machine learning model to obtain a joint feature of the skeleton joint.

Figure 9:
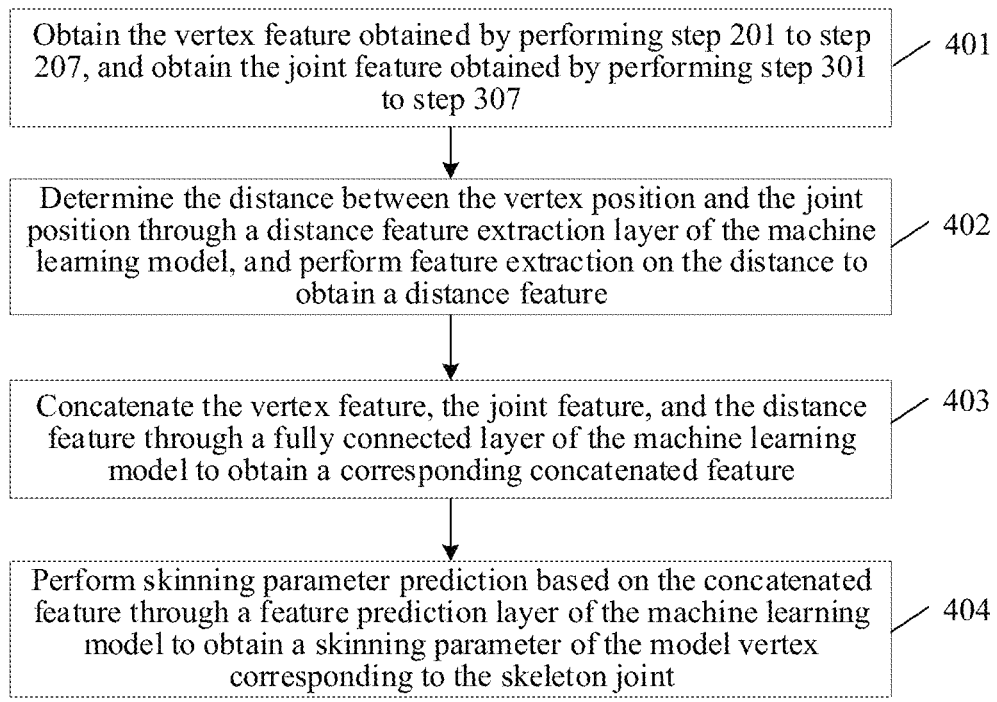
FIG. 9 is a schematic flowchart showing determining a skinning parameter of a model vertex corresponding to a skeleton joint according to an embodiment of this application.

FIG. 9 is a schematic flowchart showing determining a skinning parameter of a model vertex corresponding to a skeleton joint according to an embodiment of this application, including the following steps: Step 401: Obtain the vertex feature obtained by performing step 201 to step 207, and obtain the joint feature obtained by performing step 301 to step 307. Step 402: Determine the distance between the vertex position and the joint position through a distance feature extraction layer of the machine learning model, and perform feature extraction on the distance to obtain a distance feature. Step 403: Concatenate the vertex feature, the joint feature, and the distance feature through a fully connected layer of the machine learning model to obtain a corresponding concatenated feature. Step 404: Perform skinning parameter prediction based on the concatenated feature through a feature prediction layer of the machine learning model to obtain the skinning parameter of the model vertex corresponding to the skeleton joint.

Through application of the foregoing embodiment, based on the existence of the machine learning model, the skinning parameter can be calculated according to the vertex position of the model vertex and the joint position of the skeleton joint, so that virtual object skinning can be implemented for virtual objects of various forms of skeleton structures, thereby improving a skinning effect.

In some other embodiments, the terminal may determine the skinning parameter of the model vertex corresponding to the each skeleton joint in the following manner: performing the following processing for the each model vertex: obtaining at least one target skeleton joint associated with the model vertex from the at least one skeleton joint; and determining a skinning parameter of each target skeleton joint corresponding to the model vertex based on the vertex position and a joint position of the at least one target skeleton joint.

Herein, the terminal performs the following processing for the each model vertex: obtaining at least one target skeleton joint associated with the model vertex from the at least one skeleton joint, where the target skeleton joint may be a skeleton joint whose distance from the model vertex is smaller than a distance threshold, or may be a skeleton joint bound to the model vertex, or the like. Then, the vertex position and the joint position of the at least one target skeleton joint are calculated, and the skinning parameter of the model vertex corresponding to the each target skeleton joint is determined. Through application of the foregoing embodiment, only some target skeleton joints are selected from the skeleton joints included in the object skeleton to determine the skinning parameter of the model vertex corresponding to the each target skeleton joint, thereby reducing a calculation amount and improving calculation efficiency.

Step 104: Skin the object skeleton of the virtual object based on the skinning parameter corresponding to the at least one model vertex to obtain a skinning result.

The skinning result is used for rendering to obtain the virtual object.

Herein, after determining the skinning parameter corresponding to the each model vertex, the terminal skins the object skeleton of the virtual object based on the skinning parameter corresponding to the at least one model vertex, thereby obtaining the virtual object through rendering based on the skinning result obtained through skinning.

In some embodiments, the terminal may skin the object skeleton of the virtual object based on the skinning parameter corresponding to the at least one model vertex in the following manner to obtain a skinning result: obtaining a skeletal transformation parameter corresponding to the each skeleton joint; determining, for the each model vertex, a target vertex position of the each skeleton joint corresponding to the model vertex based on the vertex position of the model vertex, the skinning parameter of the model vertex corresponding to the each skeleton joint, and the skeletal transformation parameter corresponding to the each skeleton joint; and skinning the object skeleton of the virtual object based on the target vertex position corresponding to the at least one model vertex to obtain a skinning result.

Herein, after determining the skinning parameter corresponding to the each model vertex, the terminal obtains a skeletal transformation parameter corresponding to the each skeleton joint. The skeletal transformation parameter is a skeletal transformation matrix corresponding to the skeleton joint. Then, for the each model vertex, the target vertex position of the each skeleton joint corresponding to the model vertex is determined based on the vertex position of the model vertex, the skinning parameter of the model vertex corresponding to the each skeleton joint, and the skeletal transformation parameter corresponding to the each skeleton joint, so that the object skeleton of the virtual object can be skinned based on the target vertex position corresponding to the at least one model vertex.

Through application of the foregoing embodiment, the skinning of the object skeleton of the virtual object is implemented based on the obtained skinning parameter, and the obtained skinning result can make a display effect of the virtual object obtained through rendering better, thereby improving the sense of immersion and experience of a user in a virtual scene.

In some embodiments, the terminal may determine, in the following manner, the target vertex position of the each skeleton joint corresponding to the model vertex based on the vertex position of the model vertex, the skinning parameter of the model vertex corresponding to the each skeleton joint, and the skeletal transformation parameter corresponding to the each skeleton joint: multiplying, for the each skeleton joint, the vertex position of the model vertex, the skinning parameter of the model vertex corresponding to the skeleton joint, and the skeletal transformation parameter corresponding to the skeleton joint to obtain an intermediate vertex position of the model vertex corresponding to the skeleton joint; and adding the one or more intermediate vertex positions corresponding to the at least one skeleton joint to obtain the target vertex position of the each skeleton joint corresponding to the model vertex.

In an example, a vertex position of model vertex 1 included in the three-dimensional model is determined by joint positions of skeleton joint 1, skeleton joint 2, and skeleton joint 3, that is, model vertex 1 is affected by skeleton joint 1, skeleton joint 2, and skeleton joint 3, and influence weights (that is, skinning parameters) of skeleton joint 1 to skeleton joint 3 on model vertex 1 are respectively 0.5, 0.2, and 0.3. Target vertex position of Model vertex 1=0.5×(Vertex position of Model vertex 1)×(Skeletal transformation matrix of Skeleton joint 1)+0.2×(Vertex position of Model vertex 1)×(Skeletal transformation matrix of Skeleton joint 2)+0.3×(Vertex position of Model vertex 1)× (Skeletal transformation matrix of Skeleton joint 3).

Through application of the foregoing embodiment, for a virtual object to be skinned, a three-dimensional model and an object skeleton of the virtual object are obtained, and a vertex position of at least one model vertex included in the three-dimensional model and a joint position of at least one skeleton joint included in the object skeleton are determined, so that for each model vertex, a skinning parameter of the model vertex corresponding to each skeleton joint is determined based on the vertex position and the at least one joint position. The vertex position of the model vertex is determined by the joint position of the at least one skeleton joint, and the skinning parameter is used for indicating an influence weight of the each skeleton joint on the model vertex. Therefore, the object skeleton of the virtual object can be skinned based on a skinning parameter corresponding to the at least one model vertex, to perform rendering based on a skinning result to obtain the virtual object. Herein, virtual objects with various forms of skeleton structures may have respective three-dimensional models and object skeletons. In this way, skinning of the virtual objects with the various forms of skeleton structures can be implemented based on the three-dimensional models and the object skeletons of the virtual objects, and there is no need to implement skinning of different skeletons by using a super skeleton as a frame, thereby improving an effect of virtual object skinning, and increasing flexibility of the virtual object skinning.

The following describes an exemplary application of the embodiments of this application in an actual application scenario. Next, some terms involved in the embodiments of this application are first explained:

(1) Three-dimensional model (3D mesh) is a 3D model of a virtual object, as shown in part (1) of FIG. 4.

(2) Skinning is a three-dimensional animation term used in a 3D virtual scene (such as a game scene). On the basis of a three-dimensional model created in three-dimensional software, skeletons are to be added to the three-dimensional model. However, the skeletons and the three-dimensional model are independent of each other. Therefore, to cause the skeletons to drive the three-dimensional model to produce proper movement, the three-dimensional model is bound to the skeleton, and a technology for achieving this is referred to as skinning. In an example, model vertex 1 on the 3D mesh is affected by the action of skeleton joint 1, skeleton joint 2, and skeleton joint 3, and an influence weight of each skeleton joint on model vertex 1 is 0.5, 0.2, and 0.3, respectively. Based on the influence weight, a position of a mesh vertex may be updated through movement of the skeleton, so that the vertex has displacement, which is equivalent to controlling motion of the mesh vertex. This is the basis of skeletal animation. A schematic diagram of a skeleton structure is shown in part (2) of FIG. 4.

(3) Automatic skinning is to automatically establish a binding relationship between a mesh model and an object skeleton to perform skinning based on the binding relationship.

Figure 10:
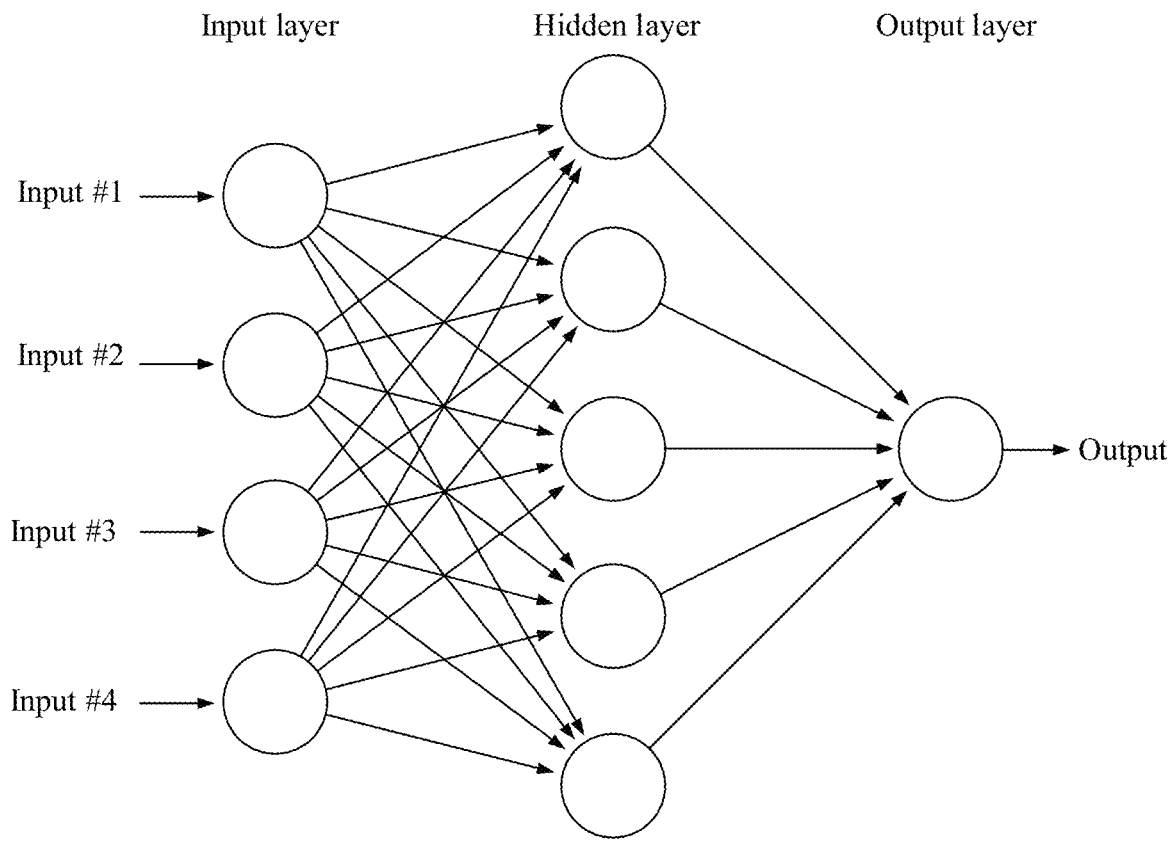
FIG. 10 is a schematic structural diagram of a multilayer perceptron (MLP) according to an embodiment of this application.

(4) MLP: FIG. 10 is a schematic structural diagram of a multilayer perceptron according to an embodiment of this application. Herein, the multilayer perceptron is a composition form of a set of basic networks in a machine learning model, and includes an input layer, a plurality of hidden layers and an output layer.

Figure 11:
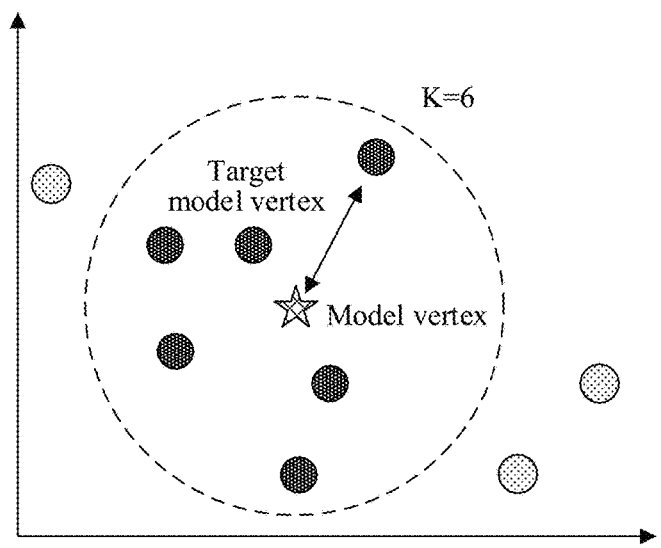
FIG. 11 is a schematic diagram of a target model vertex associated with a model vertex according to an embodiment of this application.

(5) k-NN is used for calculating k other model vertices with a closest Euclidean distance to each model vertex. FIG. 11 is a schematic diagram of a target model vertex associated with a model vertex according to an embodiment of this application. Herein, K=6. In this case, there are six target model vertices associated with model vertex 1, which are target model vertices of six nearest neighbors of model vertex 1.

(6) Two-dimensional convolutional layer (Conv2d) is a network structure commonly used in the machine learning model.

Figure 12:
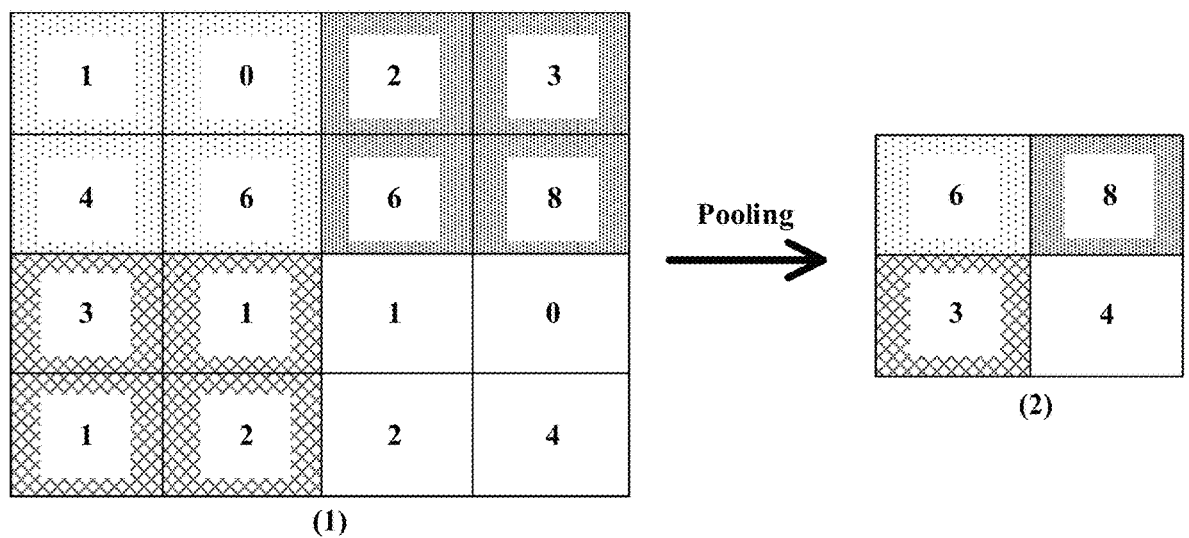
FIG. 12 is a schematic diagram of selecting a maximum value based on a maximum pooling layer according to an embodiment of this application.

(7) Maximum pooling layer (MaxPooling) is a network structure used in the machine learning model for obtaining a maximum value of a dimension or some dimensions or some regions. FIG. 12 is a schematic diagram of selecting a maximum value based on a maximum pooling layer according to an embodiment of this application. Herein, for 16 squares shown in part (1) of FIG. 12, for every four squares, the maximum value in the four squares is selected through pooling, to obtain a pooling result shown in part (2) of FIG. 12.

(8) KL distance (Kullback-Leibler divergence) is used for measuring a distance between two probability distributions, and is the loss function of the machine learning model in embodiments of this application, and the formula is as follows:

$$KL(p\|q) = \sum p_i(x)\log\left(\frac{p_i(x)}{q_i(x)}\right);$$

where $KL(p\|q)$ is a value of the loss function, $p_i(x)$ represents an actual skinning parameter (that is, an influence weight), and $q_i(x)$ represents a prediction result obtained through prediction by the machine learning model.

In related technologies, skeleton joints of skeletons in various forms required during skeleton skinning are usually unified into a super skeleton, so that the super skeleton can be skinned correspondingly according to different influence weights of all skeleton joints in the super skeleton that correspond to all vertices of a three-dimensional model during the skeleton skinning, to implement different forms of skeleton skinning through the super skeleton. However, the skeleton joints that can be unified into a super skeleton usually correspond to similar or slightly different skeleton structures. Therefore, skinning of virtual objects with similar skeleton structures can still be achieved in the related technologies, but skinning of virtual objects with greatly different skeleton structures (such as a person and an animal) cannot be supported, leading to a poor skinning effect.

Figure 13:
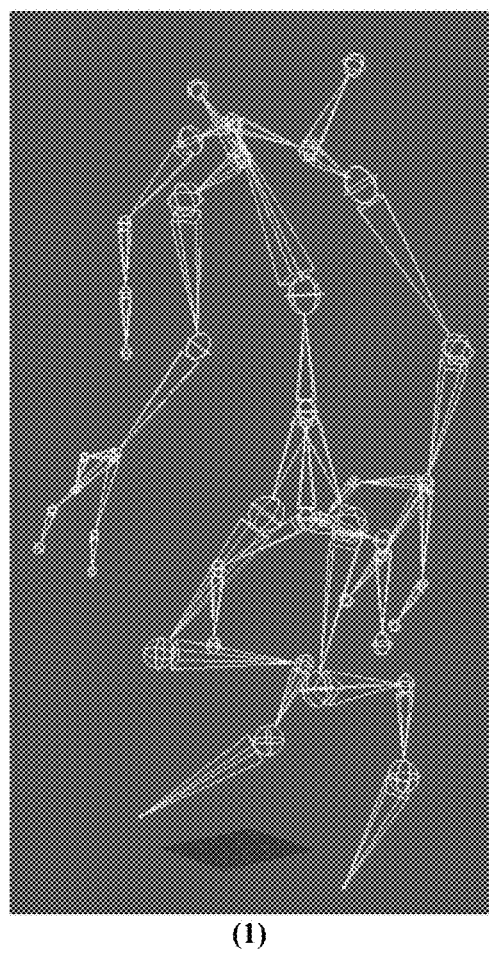
FIG. 13 is a schematic diagram of an object skeleton according to an embodiment of this application.
Figure 13:

In view of this, an embodiment of this application provides a skinning method for a virtual object, to at least resolve the foregoing existing problems. The following continues to describe a skinning method for a virtual object provided in the embodiments of this application. During actual application, the skinning may encounter various types of object skeletons, such as human-shaped, animal-shaped, monster-shaped skeletons. Even for human-shaped skeletons, various types of skirt structures may be added thereto, or the skeleton changes greatly due to design features. FIG. 13 is a schematic diagram of an object skeleton according to an embodiment of this application. Herein, both part (1) and part (2) of FIG. 13 are schematic diagrams of skeletons of characters. Due to differences in character design (such as postures or shapes), the shapes of the skeletons in part (1) and part (2) of FIG. 13 also differ greatly, including differences in a quantity of skeleton and differences in shapes.

Still referring to FIG. 4, as shown in part (1) of FIG. 4, the three-dimensional model (3D Mesh) may be considered as a graph including points (model vertices) and their relationships (edges), referred to as a mesh-graph for short. As shown in part (2) of FIG. 4, the object skeleton may also be considered as a graph including skeleton joints (points) and parent-child relationships between the skeleton joints, referred to as a skeleton-graph for short. The skinning process may be understood as a process of establishing matching between two graphs (that is, between the three-dimensional model and the object skeleton).

In embodiments of this application, a supervised learning method based on the machine learning model is used. First, the vertex feature of the each model vertex of the three-dimensional model and the joint feature of the each skeleton joint of the object skeleton are extracted through the machine learning model. Then, the skinning parameter (that is, the influence weight) of the each skeleton joint corresponding to the model vertex is obtained through prediction by the machine learning model based on the vertex feature and the feature of the skeleton joint. During actual implementation, the machine learning model may be constructed based on an open source Python machine learning library, whose inputs are represented by (*, c_in) and outputs are represented by (*, c_out), where * represents a quantity of model vertices, and c_in represents a feature dimension of each model vertex. For example, c_in may be position information of three dimensions (x, y, z), and may be used for learning vertex features corresponding to three-dimensional models with different quantities of vertices, and for learning joint features corresponding to object skeletons with different skeleton shapes. In this way, the machine learning model is constructed, and training is performed by using provided artificial skinning data, so that the trained machine learning model can be obtained to adapt to automatic skinning of various types of three-dimensional models and object skeletons.

The following describes, from the product side, the skinning method for a virtual object provided in the embodiments of this application. Referring to FIG. 5, in the virtual object skinning interface, a model selection function option for selecting a three-dimensional model of the virtual object and a skeleton selection function option for selecting an object skeleton of the virtual object are displayed, and a confirmation function option "Select" corresponding to the model selection function option and a confirmation function option "Select" corresponding to the skeleton selection function option are displayed. In addition, a skinning function option "Start skinning" for triggering a skinning instruction for the virtual object is also displayed. During actual implementation: (1) Select a three-dimensional model that needs to be processed. (2) Click/Tap on a "Select" button on the right of "Select model in scene" to trigger a confirmation operation for the selected three-dimensional model. (3) Select an object skeleton that needs to be processed. (4) Click/Tap on a "Select" button on the right of "Select skeleton in scene" to trigger a confirmation operation for the selected object skeleton. (5) Click/Tap on a button "Start skinning" to perform skinning. During actual implementation, a functional interface for user-customized processing (such as fixing weights at particular seams) and a functional interface for configuring service parameters (such as project names or network addresses) may be further provided.

Referring to FIG. 6, the machine learning model includes a position feature extraction layer, a position feature update layer, a local feature extraction layer, a global feature extraction layer, a feature processing layer, a distance feature extraction layer, a fully connected layer, and a feature prediction layer. Herein, the position feature extraction layer (Position-MLP), the local feature extraction layer (Local-MLP), and the global feature extraction layer (Global-MLP) are constructed based on MLP networks. A structure of each MLP network is shown in Table (1) above, which is also reproduced below for convenience:

TABLE 1

| Name | Quantity of hidden layers | Dimension of hidden layers | Dimension of output layers |
| --- | --- | --- | --- |
| Position-MLP | 1 | 128 | 64 |
| Global-MLP | 2 | 512 | 256 |
| Local-MLP | 2 | 512 | 256 |

Inputs of the position feature extraction layer are (N, 3) and (M, 3). Herein, N represents a quantity of inputted model vertices of the three-dimensional model, M represents a quantity of inputted skeleton joints of the object skeleton, (N, 3) represents three-dimensional position information $(x1, y1, z1)$ of the model vertex, and (M, 3) represents three-dimensional position information $(x2, y2, z2)$ of the skeleton joint.

Figure 14:
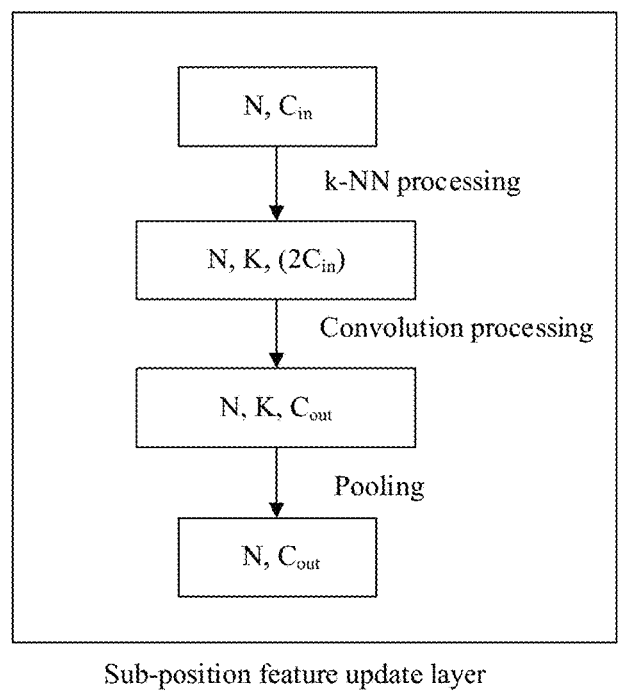
FIG. 14 is a schematic structural diagram of a position feature update sub-layer according to an embodiment of this application.

The position feature update layer includes a plurality of position feature update sub-layers (such as an edge convolution network EdgeConv). Each EdgeConv is used for extracting neighborhood information of a three-dimensional model and an object skeleton. Using processing of model vertices as an example, the EdgeConv may calculate a Euclidean distance between every two vertices in the three-dimensional model according to the position feature of each model vertex, and determine k neighboring model vertices (that is, the foregoing at least one target model vertex associated with the model vertex and determined through the k-NN algorithm), referred to as k-NN for short, of each model vertex. Then, position features of the k neighboring model vertices are aggregated to update the position feature of the model vertex to obtain an updated position feature. FIG. 14 is a schematic structural diagram of a position feature update sub-layer according to an embodiment of this application. The processing of (N) model vertices is used as an example. Herein, C_in represents a feature dimension of EdgeConv input (N, C_in), that is, a feature dimension of the position feature of the model vertex. Neighboring model vertices with a quantity of K that are associated with the model vertex are extracted through the k-NN algorithm (Sample Neighbors). Then, position features of the model vertex and the K associated neighboring model vertices are convolved through the convolutional layer (that is, Conv2d{64, 64}) to obtain a convolution result (N, K, C_out). Then, an updated position feature (N, C_out) is outputted through the maximum pooling layer. C_out represents a feature dimension outputted by EdgeConv. Herein, three EdgeConv networks are stacked to increase a depth of the network, thereby helping improve a fitting capability of a neural network.

The local feature extraction layer (Local-MLP) is used for processing based on outputs of the position feature extraction layer (Position-MLP) and outputs of the each position feature update sub-layer (EdgeConv) to obtain local features. Using processing of model vertices as an example, the local feature extraction layer (Local-MLP) obtains the local vertex feature. The global feature extraction layer (Global-MLP) performs processing based on the output of the each position feature update sub-layer (EdgeConv) to obtain global features. Using processing of model vertices as an example, the global feature extraction layer (Global-MLP) obtains the global vertex feature.

Using processing of model vertices as an example, the feature processing layer (that is, the intermediate subtraction operation between the Global-MLP and the Local-MLP) is used for subtracting the global vertex feature outputted by the global feature extraction layer (Global-MLP) from the local vertex feature outputted by the local feature extraction layer (Local-MLP) to obtain a vertex feature (N, C1). C1 is a feature dimension of the vertex feature. Using processing of skeleton joints as an example, the feature processing layer is used for subtracting the global joint feature outputted by the global feature extraction layer (Global-MLP) from the local joint feature outputted by the local feature extraction layer (Local-MLP) to obtain a joint feature (M, C2). C2 is a feature dimension of the joint feature.

The distance feature extraction layer includes three distance feature extraction sub-layers (Dist network). Each distance feature extraction sub-layer is connected to a corresponding position feature update sub-layer (EdgeConv). The distance feature is outputted based on the updated vertex position feature and joint position feature that are outputted by the corresponding position feature update sub-layer (EdgeConv).

The fully connected layer (concate layer) is used for concatenating the vertex feature outputted by the feature processing layer, the joint feature outputted by the feature processing layer, and the distance feature outputted by each distance feature extraction sub-layer (Dist network) to obtain a concatenated feature (N, M, C_total). C_total is a feature dimension of the concatenated feature.

The feature prediction layer (Predict-MLP) is used for performing skinning parameter (that is, influence weight) prediction based on the concatenated feature. Specifically, the feature prediction layer (Predict-MLP) outputs (N, M, 1) through the MLP based on the inputted concatenated feature (N, M, C_total), removes the last dimension through a squeeze operation to obtain (N, M), and then outputs, through an operation of the softmax function, a prediction result, that is, an influence weight of each skeleton corresponding to the model vertex.

The foregoing networks Position-MLP, EdgeConv, Global-MLP, and Local-MLP are shared by the three-dimensional model (mesh-graph) and the object skeleton (skeleton-graph). Each network has two sets of outputs. One set represents the output of the mesh-graph, and the other set represents the output of the skeleton-graph.

During actual application, the used of the machine learning model is divided into two parts: offline training and online application. The offline training may be based on existing skinning data. The input of the machine learning model only requires 3D position information of mesh vertices and 3D position information of skeleton joints. The machine learning model outputs a predicted influence weight of each model vertex on each skeleton joint. The KL-divergence (that is, the difference) is calculated according to the predicted influence weight and an artificially bound real influence weight. Then, the model parameters of the machine learning model are updated according to the value of the loss function with reference to an Adam weight optimization algorithm. During online application, after the trained machine learning model is obtained, the 3D position information of the model vertex of the three-dimensional model and the 3D position information of the skeleton joint of the object skeleton are inputted. In this way, the machine learning model can output the predicted influence weight.

During actual implementation, during the training of the machine learning model, a model vertex on each mesh-graph may correspond to only skeleton joints on some skeleton-graphs. This can increase a training speed and reduce video RAM usage.

Through application of the foregoing embodiment of this application, a machine learning model trained based on existing artificial skinning data can meet automatic skinning requirements of different meshes and skeletons. In the machine learning model obtained through training based on skinning data of a plurality of virtual objects as a training set, an average value of errors of influence weights on a test set (where data in the test set is skinning data that has never appeared in the data of the training set) is very small, and the automatic skinning effect is accurate.

Figure 15:
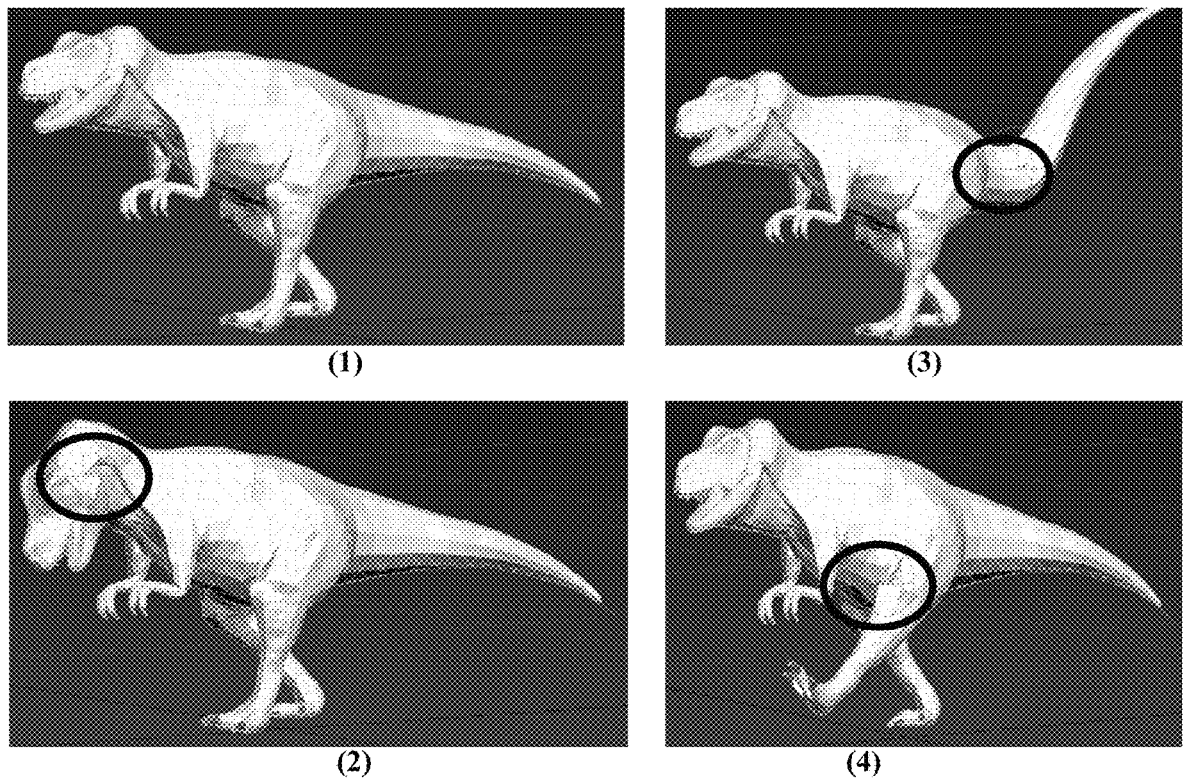
FIG. 15 is a first schematic diagram showing a skinning effect of a virtual object according to an embodiment of this application.
Figure 16:
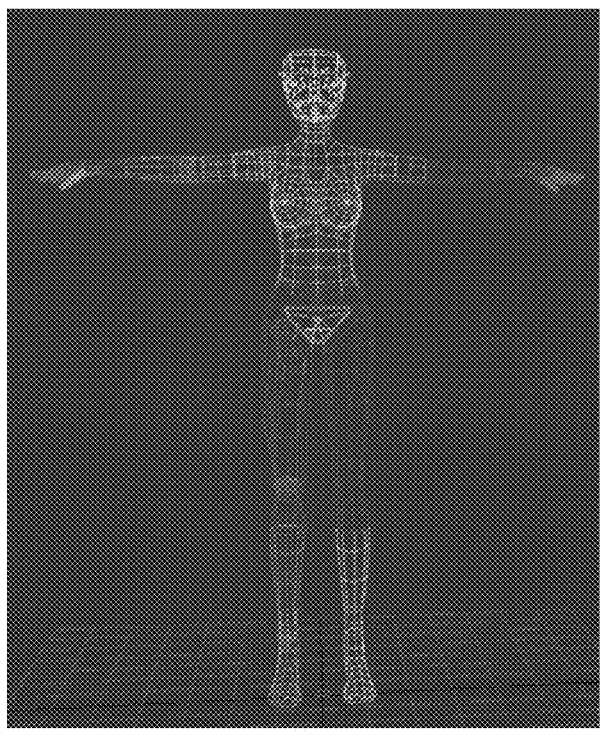
FIG. 16 is a second schematic diagram showing a skinning effect of a virtual object according to an embodiment of this application.
Figure 16:
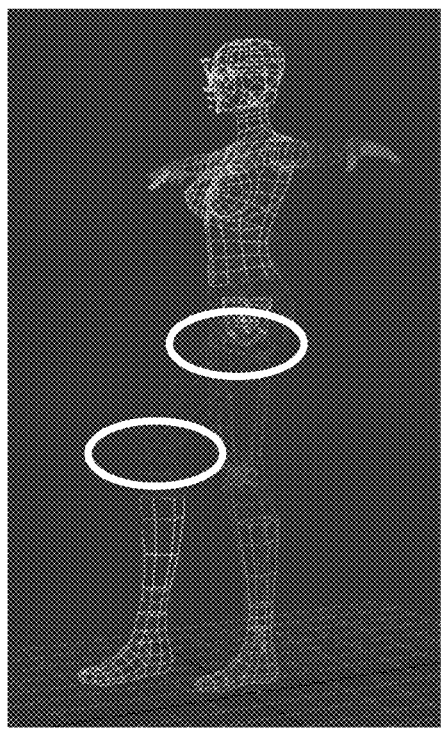
Figure 16:
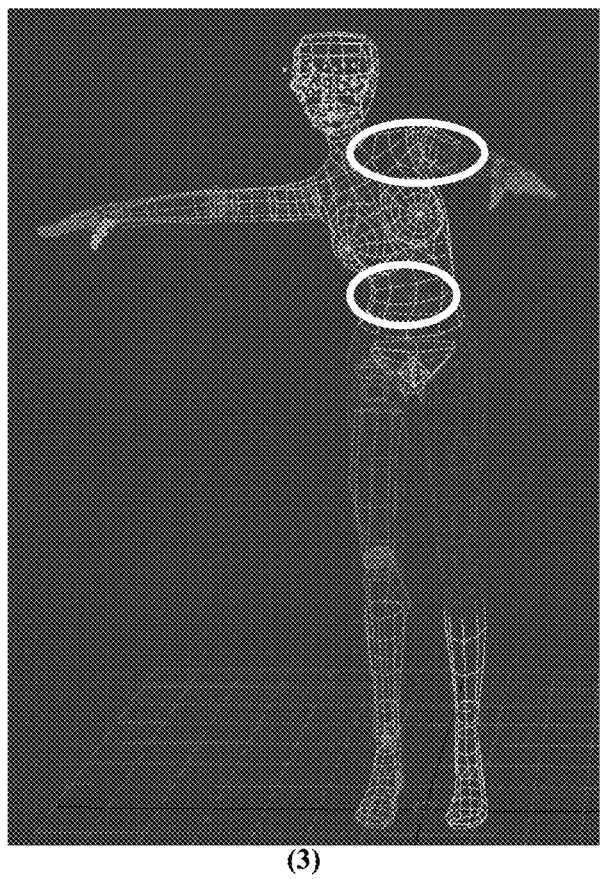
Figure 16:
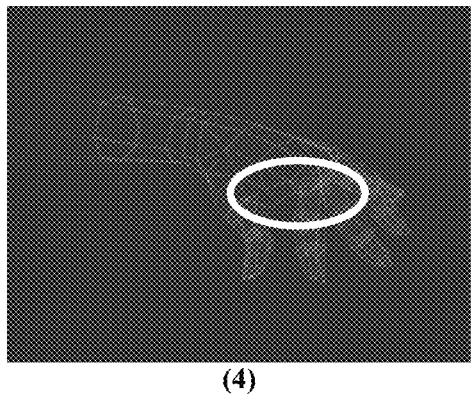

FIG. 15 is a first schematic diagram showing a skinning effect of a virtual object according to an embodiment of this application. FIG. 16 is a second schematic diagram of a skinning effect of a virtual object according to an embodiment of this application. FIG. 15 shows skinning effects of an animal virtual object, including a skinning effect of the animal virtual object in a static state (as shown in part (1) of FIG. 15), a skinning effect of the animal virtual object in a motion state (joint motion of the head) (as shown in part (2) of FIG. 15), a skinning effect of the animal virtual object in a motion state (joint motion of the tail) (as shown in part (3) of FIG. 15), and a skinning effect of the animal virtual object in a motion state (joint motion of a leg) (as shown in part (4) of FIG. 15).

FIG. 16 shows skinning effects of a person virtual object, including a skinning effect of the person virtual object in a static state (as shown in part (1) of FIG. 16), a skinning effect of the person virtual object in a motion state (joint motion of a thigh and a calf) (as shown in part (2) of FIG. 16), a skinning effect of the person virtual object in a motion state (joint motion of an arm and the upper body) (as shown in part (3) of FIG. 16), and a skinning effect of the person virtual object in a motion state (joint motion of fingers) (as shown in part (4) of FIG. 16). It can be learned with reference to FIG. 15 and FIG. 16 that, whether for animal-shaped or human-shaped meshes and skeletons, the skinning method for a virtual object provided in the embodiments of this application can achieve a good skinning effect.

It can be understood that, user information and other related data are involved in the embodiments of this application. When the embodiments of this application are applied to a specific product or technology, user permission or consent is required, and collection, use, and processing of the related data need to comply with the relevant laws, regulations, and standards of the relevant countries and regions.

The following continues to describe an exemplary structure in which the skinning apparatus 553 for a virtual object provided in the embodiments of this application is implemented as a software module. In some embodiments, as shown in FIG. 2, the software module in the skinning apparatus 553 for a virtual object that is stored in the memory 550 may include: an obtaining module 5531, configured to obtain a three-dimensional model and an object skeleton of the virtual object; a first determining module 5532, configured to determine a vertex position of at least one model vertex included in the three-dimensional model and a joint position of at least one skeleton joint included in the object skeleton; a second determining module 5533, configured to determine, for each model vertex, a skinning parameter of the model vertex corresponding to each skeleton joint based on the vertex position and the at least one joint position, the vertex position of the model vertex being determined by the joint position of the at least one skeleton joint, and the skinning parameter being used for indicating an influence weight of the each skeleton joint on the model vertex; and a skinning module 5534, configured to skin the object skeleton of the virtual object based on the skinning parameter corresponding to the at least one model vertex to obtain a skinning result, the skinning result being used for rendering to obtain the virtual object.

In some embodiments, the second determining module 5533 is further configured to perform the following processing for the joint position of the each skeleton joint: performing feature extraction on the vertex position to obtain a vertex feature of the model vertex, and performing feature extraction on the joint position to obtain a joint feature of the skeleton joint; determining a distance feature corresponding to a distance between the vertex position and the joint position; and determining the skinning parameter of the model vertex corresponding to the skeleton joint based on the vertex feature, the joint feature, and the distance feature.

In some embodiments, the second determining module 5533 is further configured to perform feature extraction on the vertex position through a position feature extraction layer of a machine learning model to obtain a first position feature of the model vertex; update the first position feature based on a vertex position of at least one target model vertex associated with the model vertex through a position feature update layer of the machine learning model to obtain a second position feature of the model vertex; determine a local vertex feature of the model vertex based on the first position feature and the second position feature through a local feature extraction layer of the machine learning model; determine a global vertex feature of the model vertex based on the second position feature through a global feature extraction layer of the machine learning model; and perform a subtraction operation between the local vertex feature and the global vertex feature through a feature processing layer of the machine learning model to obtain the vertex feature of the model vertex.

In some embodiments, the position feature update layer includes at least two cascaded position feature update sub-layers; and the second determining module 5533 is further configured to update the first position feature based on the vertex position of the at least one target model vertex associated with the model vertex through a first level position feature update sub-layer to obtain a corresponding intermediate position feature; and update the intermediate position feature based on the vertex position of the at least one target model vertex associated with the model vertex through a non-first level position feature update sub-layer to obtain the second position feature.

In some embodiments, the second determining module 5533 is further configured to determine vertex distances between the model vertex and at least two model vertices in the three-dimensional model other than the model vertex through the position feature update layer of the machine learning model; sort the at least two other model vertices in ascending order of the vertex distances to obtain a corresponding sorting result; and select a target quantity of other model vertices ranking top based on the sorting result as the at least one target model vertex associated with the model vertex.

In some embodiments, the second determining module 5533 is further configured to perform feature extraction on the each target model vertex through the position feature update layer of the machine learning model to obtain a corresponding target position feature; average the at least one target position feature to obtain an average position feature; and update the first position feature to the average position feature, and use the updated first position feature as the second position feature of the model vertex.

In some embodiments, the position feature update layer includes at least two cascaded position feature update sub-layers, and each of the position feature update sub-layers outputs a corresponding intermediate position feature. The second determining module 5533 is further configured to input the first position feature and each intermediate position feature into the local feature extraction layer; and output the local vertex feature of the model vertex based on the first position feature and the each intermediate position feature through the local feature extraction layer.

In some embodiments, the position feature update layer includes at least two cascaded position feature update sub-layers, and each of the position feature update sub-layers outputs a corresponding intermediate position feature. The second determining module 5533 is further configured to input each intermediate position feature into the global feature extraction layer; and output the global vertex feature of the model vertex based on the each intermediate position feature through the global feature extraction layer.

In some embodiments, the machine learning model further includes a distance feature extraction layer, and the second determining module 5533 is further configured to determine the distance between the vertex position and the joint position through the distance feature extraction layer of the machine learning model; and perform feature extraction on the distance to obtain the distance feature.

In some embodiments, the machine learning model further includes a fully connected layer and a feature prediction layer, and the second determining module 5533 is further configured to concatenate the vertex feature, the joint feature, and the distance feature through the fully connected layer of the machine learning model to obtain a corresponding concatenated feature; and perform skinning parameter prediction based on the concatenated feature through the feature prediction layer of the machine learning model to obtain the skinning parameter of the model vertex corresponding to the skeleton joint.

In some embodiments, the second determining module 5533 is further configured to obtain training samples for training the machine learning model, the training samples being labeled with corresponding sample labels, and the training samples including a vertex position sample and a joint position sample; perform skinning parameter prediction based on the vertex position sample and the joint position sample through the machine learning model to obtain a prediction result; obtain a difference between the prediction result and the sample label, and determine a value of a loss function of the machine learning model based on the difference; and update model parameters of the machine learning model based on the value of the loss function to obtain a trained machine learning model.

In some embodiments, the second determining module 5533 is further configured to perform the following processing for the each model vertex: obtaining at least one target skeleton joint associated with the model vertex from the at least one skeleton joint; and determining a skinning parameter of the model vertex corresponding to each target skeleton joint based on the vertex position and a joint position of the at least one target skeleton joint.

In some embodiments, the skinning module 5534 is further configured to obtain a skeletal transformation parameter corresponding to the each skeleton joint; determine, for the each model vertex, a target vertex position of the each skeleton joint corresponding to the model vertex based on the vertex position of the model vertex, the skinning parameter of the model vertex corresponding to the each skeleton joint, and the skeletal transformation parameter corresponding to the each skeleton joint; and skin the object skeleton of the virtual object based on the target vertex position corresponding to the at least one model vertex to obtain a skinning result.

In some embodiments, the skinning module 5534 is further configured to multiply, for the each skeleton joint, the vertex position of the model vertex, the skinning parameter of the model vertex corresponding to the skeleton joint, and the skeletal transformation parameter corresponding to the skeleton joint to obtain an intermediate vertex position of the model vertex corresponding to the skeleton joint; and add the one or more intermediate vertex positions corresponding to the at least one skeleton joint to obtain the target vertex position of the each skeleton joint corresponding to the model vertex.

In some embodiments, the obtaining module 5531 is further configured to present a model selection function option, a skeleton selection function option, and a skinning function option in a virtual object skinning interface; receive a target three-dimensional model selected based on the model selection function option, and determine the target three-dimensional model as the three-dimensional model in response to a confirmation operation for the target three-dimensional model; receive a target object skeleton selected based on the skeleton selection function option, and determine the target object skeleton as the object skeleton in response to a confirmation operation for the target object skeleton; and obtaining the three-dimensional model and the object skeleton of the virtual object in response to a trigger operation for the skinning function option.

Through application of the foregoing embodiment, for a virtual object to be skinned, a three-dimensional model and an object skeleton of the virtual object are obtained, and a vertex position of at least one model vertex included in the three-dimensional model and a joint position of at least one skeleton joint included in the object skeleton are determined, so that for each model vertex, a skinning parameter of the model vertex corresponding to each skeleton joint is determined based on the vertex position and the at least one joint position. The vertex position of the model vertex is determined by the joint position of the at least one skeleton joint, and the skinning parameter is used for indicating an influence weight of the each skeleton joint on the model vertex. Therefore, the object skeleton of the virtual object can be skinned based on a skinning parameter corresponding to the at least one model vertex, to perform rendering based on a skinning result to obtain the virtual object. Herein, virtual objects with various forms of skeleton structures may have respective three-dimensional models and object skeletons. In this way, skinning of the virtual objects with the various forms of skeleton structures can be implemented based on the three-dimensional models and the object skeletons of the virtual objects, and there is no need to implement skinning of different skeletons by using a super skeleton as a frame, thereby improving an effect of virtual object skinning, and increasing flexibility of the virtual object skinning.

An embodiment of this application further provides a computer program product, the computer program product including a computer program or a computer executable instruction, and the computer program or the computer executable instruction being stored in a computer-readable storage medium. A processor of a computer device reads the computer program or the computer executable instruction from the computer-readable storage medium. The processor executes the computer program or the computer executable instruction, so that the computer device performs the skinning method for a virtual object provided in the embodiments of this application.

An embodiment of this application further provides a computer-readable storage medium, storing a computer executable instruction, the computer executable instruction, when executed by a processor, causing the processor to perform the skinning method for a virtual object provided in the embodiments of this application.

In some embodiments, the computer-readable storage medium may be a memory such as a FRAM, a ROM, a PROM, an EPROM, an EEPROM, a flash memory, a magnetic surface memory, a compact disc, or a CD-ROM; or may be various devices including one of or any combination of the foregoing memories.

In some embodiments, the computer executable instruction may be written in the form of a program, software, a software module, a script, or code in any form of programming language (including complied or interpreted languages, or declarative or procedural languages), and may be deployed in any form, including being deployed as a stand-alone program or deployed as a module, a component, a subroutine, or other units suitable for use in a computing environment.

In an example, the computer executable instruction may, but does not necessarily, correspond to a file in a file system, and may be stored in part of a file that holds other programs or data, for example, stored in one or more scripts in a Hyper Text Markup Language (HTML) document, or in a single file specifically used for the program under discussion, or in a plurality of collaborative files (for example, files storing one or more modules, subprograms, or code sections).

In an example, the computer executable instruction may be deployed to be executed on one computing device, or executed on a plurality of computing devices at the same location, or executed on a plurality of computing devices that are distributed at a plurality of locations and interconnected through a communication network.

The foregoing descriptions are merely embodiments of this application and are not intended to limit the protection scope of this application. Any modification, equivalent replacement, or improvement made without departing from the spirit and scope of this application shall fall within the protection scope of this application.

What is claimed is:

1. A skinning method comprising:
obtaining a three-dimensional model and an object skeleton of a virtual object;
determining a vertex position of a model vertex of the three-dimensional model and a joint position of a skeleton joint of the object skeleton, the vertex position being determined by at least the joint position;
performing feature extraction on the vertex position through a position feature extraction layer of a machine learning model to obtain a first position feature of the model vertex;
updating the first position feature based at least on a vertex position of each of at least one target model vertex associated with the model vertex through a position feature update layer of the machine learning model to obtain a second position feature of the model vertex;
determining a local vertex feature of the model vertex based at least on the first position feature and the second position feature through a local feature extraction layer of the machine learning model;
determining a global vertex feature of the model vertex based at least on the second position feature through a global feature extraction layer of the machine learning model;
performing a subtraction operation between the local vertex feature and the global vertex feature through a feature processing layer of the machine learning model to obtain a vertex feature of the model vertex;
performing feature extraction on the joint position to obtain a joint feature of the skeleton joint;
determining a distance feature corresponding to a distance between the vertex position and the joint position;
determining a skinning parameter corresponding to the skeleton joint based at least on the vertex feature, the joint feature, and the distance feature; and
skinning an object skeleton of the virtual object based at least on the skinning parameter.

2. The method according to claim 1, wherein:
the position feature update layer includes at least two cascaded position feature update sub-layers; and
updating the first position feature based at least on the vertex position of the each of the at least one target model vertex associated with the model vertex through the position feature update layer of the machine learning model to obtain the second position feature of the model vertex includes:
updating the first position feature based at least on the vertex position of the each of the at least one target model vertex associated with the model vertex through a first level position feature update sub-layer of the at least two position feature update sub-layers to obtain an intermediate position feature; and
updating the intermediate position feature based at least on the vertex position of the each of the at least one target model vertex associated with the model vertex through a non-first level position feature update sub-layer of the at least two position feature update sub-layers to obtain the second position feature.

3. The method according to claim 1, further comprising, before updating the first position feature:
determining vertex distances between the model vertex and at least two other model vertices in the three-dimensional model other than the model vertex through the position feature update layer of the machine learning model;
sorting the at least two other model vertices in ascending order of the vertex distances to obtain a sorting result; and
selecting a target quantity of top ranking other model vertices from the at least two other model vertices based at least on the sorting result as the at least one target model vertex associated with the model vertex.

4. The method according to claim 1, wherein updating the first position feature based at least on the vertex position of the each of the at least one target model vertex associated with the model vertex through the position feature update layer of the machine learning model to obtain the second position feature of the model vertex includes:
performing feature extraction on the at least one target model vertex through the position feature update layer of the machine learning model to obtain at least one target position feature each corresponding to one of the at least one target model vertex;
averaging the at least one target position feature to obtain an average position feature; and
updating the first position feature to the average position feature, the updated first position feature being the second position feature of the model vertex.

5. The method according to claim 1, wherein:
the position feature update layer includes at least two cascaded position feature update sub-layers, and each of the position feature update sub-layers is configured to output a corresponding intermediate position feature; and
determining the local vertex feature of the model vertex based at least on the first position feature and the second position feature through the local feature extraction layer of the machine learning model includes:
inputting the first position feature and each intermediate position feature into the local feature extraction layer; and
outputting the local vertex feature of the model vertex based at least on the first position feature and the each intermediate position feature through the local feature extraction layer.

6. The method according to claim 1, wherein:
the position feature update layer includes at least two cascaded position feature update sub-layers, and each of the position feature update sub-layers is configured to output a corresponding intermediate position feature; and
determining the global vertex feature of the model vertex based at least on the second position feature through the global feature extraction layer of the machine learning model includes:
inputting each intermediate position feature into the global feature extraction layer; and
outputting the global vertex feature of the model vertex based at least on the each intermediate position feature through the global feature extraction layer.

7. The method according to claim 1, wherein:
the machine learning model further includes a distance feature extraction layer; and the determining the distance feature corresponding to the distance between the vertex position and the joint position includes:
  determining the distance between the vertex position and the joint position through the distance feature extraction layer of the machine learning model; and
  performing feature extraction on the distance to obtain the distance feature.

8. The method according to claim 1, wherein:
the machine learning model further includes a fully connected layer and a feature prediction layer; and
determining the skinning parameter corresponding to the skeleton joint based at least on the vertex feature, the joint feature, and the distance feature includes:
  concatenating the vertex feature, the joint feature, and the distance feature through the fully connected layer of the machine learning model to obtain a concatenated feature; and
  performing skinning parameter prediction based on the concatenated feature through the feature prediction layer of the machine learning model to obtain the skinning parameter corresponding to the skeleton joint.

9. The method according to claim 1, further comprising:
obtaining a training sample for training the machine learning model, the training sample being labeled with a sample label, and the training sample including a vertex position sample and a joint position sample;
performing skinning parameter prediction based at least on the vertex position sample and the joint position sample through the machine learning model to obtain a prediction result;
obtaining a difference between the prediction result and the sample label, and determining a value of a loss function of the machine learning model based at least on the difference; and
updating a model parameter of the machine learning model based at least on the value of the loss function to obtain a trained machine learning model.

10. The method according to claim 1, wherein:
the skeleton joint is one of at least one skeleton joint of the object skeleton; and
determining the skinning parameter corresponding to the skeleton joint based at least on the vertex position and the joint position includes:
  obtaining at least one target skeleton joint associated with the model vertex from the at least one skeleton joint; and
  determining a skinning parameter corresponding to each of the target skeleton joint based at least on the vertex position and a joint position of the each of the at least one target skeleton joint.

11. The method according to claim 1, wherein skinning the object skeleton of the virtual object based at least on the skinning parameter includes:
  obtaining a skeletal transformation parameter corresponding to the skeleton joint;
  determining a target vertex position of the skeleton joint based at least on the vertex position of the model vertex, the skinning parameter corresponding to the skeleton joint, and the skeletal transformation parameter corresponding to the skeleton joint; and
  skinning the object skeleton of the virtual object based at least on the target vertex position.

12. The method according to claim 11, wherein determining the target vertex position of the skeleton joint based at least on the vertex position of the model vertex, the skinning parameter corresponding to the skeleton joint, and the skeletal transformation parameter corresponding to the skeleton joint includes:
  multiplying the vertex position of the model vertex, the skinning parameter corresponding to the skeleton joint, and the skeletal transformation parameter corresponding to the skeleton joint to obtain an intermediate vertex position of the model vertex corresponding to the skeleton joint; and
  adding the one or more intermediate vertex positions corresponding to the at least one skeleton joint to obtain the target vertex position of the each skeleton joint corresponding to the model vertex.

13. The method according to claim 1, wherein obtaining the three-dimensional model and the object skeleton of the virtual object includes:
  presenting a model selection function option, a skeleton selection function option, and a skinning function option in a virtual object skinning interface;
  receiving a target three-dimensional model selected based at least on the model selection function option, and determining the target three-dimensional model as the three-dimensional model in response to a confirmation operation for the target three-dimensional model;
  receiving a target object skeleton selected based on the skeleton selection function option, and determining the target object skeleton as the object skeleton in response to a confirmation operation for the target object skeleton; and
  obtaining the three-dimensional model and the object skeleton of the virtual object in response to a trigger operation for the skinning function option.

14. An electronic device comprising:
a memory storing a computer executable instruction; and
a processor configured to execute the computer executable instruction to:
  obtain a three-dimensional model and an object skeleton of a virtual object;
  determine a vertex position of a model vertex of the three-dimensional model and a joint position of a skeleton joint of the object skeleton, the vertex position being determined by at least the joint position;
  perform feature extraction on the vertex position through a position feature extraction layer of a machine learning model to obtain a first position feature of the model vertex;
  update the first position feature based at least on a vertex position of each of at least one target model vertex associated with the model vertex through a position feature update layer of the machine learning model to obtain a second position feature of the model vertex;
  determine a local vertex feature of the model vertex based at least on the first position feature and the second position feature through a local feature extraction layer of the machine learning model;
  determine a global vertex feature of the model vertex based at least on the second position feature through a global feature extraction layer of the machine learning model;
  perform a subtraction operation between the local vertex feature and the global vertex feature through a feature processing layer of the machine learning model to obtain a vertex feature of the model vertex;
  perform feature extraction on the joint position to obtain a joint feature of the skeleton joint;

determine a distance feature corresponding to a distance between the vertex position and the joint position;

determine a skinning parameter corresponding to the skeleton joint based at least on the vertex feature, the joint feature, and the distance feature; and skin an object skeleton of the virtual object based at least on the skinning parameter.

15. The electronic device according to claim 14, wherein:

the position feature update layer includes at least two cascaded position feature update sub-layers; and the processor is further configured to execute the computer executable instruction to:

update the first position feature based at least on the vertex position of the each of the at least one target model vertex associated with the model vertex through a first level position feature update sub-layer of the at least two position feature update sub-layers to obtain an intermediate position feature; and update the intermediate position feature based at least on the vertex position of the each of the at least one target model vertex associated with the model vertex through a non-first level position feature update sub-layer of the at least two position feature update sub-layers to obtain the second position feature.

16. A non-transitory computer-readable storage medium storing a computer executable instruction that, when executed by a processor, cause the processor to:

obtain a three-dimensional model and an object skeleton of a virtual object;

determine a vertex position of a model vertex of the three-dimensional model and a joint position of a skeleton joint of the object skeleton, the vertex position being determined by at least the joint position;

perform feature extraction on the vertex position through a position feature extraction layer of a machine learning model to obtain a first position feature of the model vertex;

update the first position feature based at least on a vertex position of each of at least one target model vertex associated with the model vertex through a position feature update layer of the machine learning model to obtain a second position feature of the model vertex;

determine a local vertex feature of the model vertex based at least on the first position feature and the second position feature through a local feature extraction layer of the machine learning model;

determine a global vertex feature of the model vertex based at least on the second position feature through a global feature extraction layer of the machine learning model;

perform a subtraction operation between the local vertex feature and the global vertex feature through a feature processing layer of the machine learning model to obtain a vertex feature of the model vertex;

perform feature extraction on the joint position to obtain a joint feature of the skeleton joint;

determine a distance feature corresponding to a distance between the vertex position and the joint position;

determine a skinning parameter corresponding to the skeleton joint based at least on the vertex feature, the joint feature, and the distance feature; and skin an object skeleton of the virtual object based at least on the skinning parameter.

* * * * *